(12) United States Patent
Dougherty et al.

(10) Patent No.: US 10,930,057 B2
(45) Date of Patent: Feb. 23, 2021

(54) GENERATING TWO-DIMENSIONAL PLAN FROM THREE-DIMENSIONAL IMAGE DATA

(71) Applicant: Airbnb, Inc., San Francisco, CA (US)

(72) Inventors: Wren Dougherty, San Francisco, CA (US); Ho Joon Park, San Francisco, CA (US); Yat Choi, San Francisco, CA (US); David Aaron Staub, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

(21) Appl. No.: 16/540,166

(22) Filed: Aug. 14, 2019

(65) Prior Publication Data

US 2020/0312013 A1 Oct. 1, 2020

Related U.S. Application Data

(63) Continuation-in-part of application No. 16/369,852, filed on Mar. 29, 2019.

(51) Int. Cl.
 *G06T 15/20* (2011.01)
(52) U.S. Cl.
 CPC .......... *G06T 15/20* (2013.01); *G06T 2200/08* (2013.01); *G06T 2210/04* (2013.01); *G06T 2215/16* (2013.01)
(58) Field of Classification Search
 None
 See application file for complete search history.

(56) References Cited

U.S. PATENT DOCUMENTS

| | | | |
|---|---|---|---|
| 2011/0187704 A1* | 8/2011 | Chen | G06T 15/00 345/419 |
| 2012/0128207 A1* | 5/2012 | Manabe | G06T 7/12 382/103 |
| 2012/0183204 A1 | 7/2012 | Aarts et al. | |
| 2012/0231424 A1 | 9/2012 | Calman et al. | |
| 2014/0207282 A1 | 7/2014 | Angle et al. | |
| 2015/0248719 A1 | 9/2015 | Hansen | |
| 2015/0363943 A1 | 12/2015 | Yalniz et al. | |

(Continued)

OTHER PUBLICATIONS

"U.S. Appl. No. 16/369,852, Non Final Office Action dated Apr. 16, 2020", 20 pgs.

(Continued)

*Primary Examiner* — Andrew G Yang
(74) *Attorney, Agent, or Firm* — Schwegman Lundberg & Woessner, P.A.

(57) ABSTRACT

Systems and methods are provided for accessing a three-dimensional (3D) image comprising a 3D mesh comprising a plurality of vertices and each vertex of the plurality of vertices having respective 3D coordinates within a space of the 3D mesh. The systems and methods further provide for generating a subset of the plurality of vertices comprising vertices that are within a specified height range and have a specified orientation. The systems and methods further provide for generating a two-dimensional (2D) grid corresponding to the 3D mesh, applying the subset of the plurality of vertices to the 2D grid, and rendering a 2D image of the space comprising an outer border corresponding to the size and shape of the 2D grid and indications of walls within the space based on the applied subset of the plurality of vertices.

20 Claims, 33 Drawing Sheets

(56) References Cited

U.S. PATENT DOCUMENTS

| | | |
|---|---|---|
| 2016/0042568 A1 | 2/2016 | Farnham et al. |
| 2016/0163098 A1 | 6/2016 | Blanchflower et al. |
| 2016/0196659 A1 | 7/2016 | Vrcelj et al. |
| 2016/0330522 A1 | 11/2016 | Newell et al. |
| 2017/0228940 A1 | 8/2017 | Kutliroff |
| 2017/0337435 A1 | 11/2017 | Uliyar et al. |
| 2018/0039713 A1* | 2/2018 | Mrowca .................. G06T 15/06 |
| 2018/0047208 A1 | 2/2018 | Marin et al. |
| 2018/0143756 A1 | 5/2018 | Mildrew et al. |
| 2018/0144547 A1* | 5/2018 | Shakib .................... G06T 15/60 |
| 2018/0260636 A1* | 9/2018 | Zou ........................ G06T 7/521 |
| 2018/0374276 A1* | 12/2018 | Powers .................. G06T 19/20 |
| 2019/0120633 A1* | 4/2019 | Afrouzi ............... A47L 11/4011 |
| 2019/0204089 A1* | 7/2019 | Rochan Meganathan ................... G01S 7/41 |
| 2019/0213212 A1 | 7/2019 | Adato et al. |

OTHER PUBLICATIONS

"International Application Serial No. PCT/US2020/024953, International Search Report dated Jun. 18, 2020", 2 pgs.

"International Application Serial No. PCT/US2020/024953, Written Opinion dated Jun. 18, 2020", 5 pgs.

"U.S. Appl. No. 16/369,852, Notice of Allowance dated Nov. 9, 2020", 9 pgs.

\* cited by examiner

GENERATING TWO-DIMENSIONAL PLAN FROM THREE-DIMENSIONAL IMAGE DATA

PRIORITY

This application is a continuation-in-part of U.S. patent application Ser. No. 16/369,852, filed Mar. 29, 2019, which is incorporated herein by reference in its entirety.

BACKGROUND

An online marketplace may provide a number of services (e.g., accommodations, tours, transportation) and allow users to reserve or "book" one or more services. For example, a first user (e.g., host) can list one or more services in the online marketplace and a second user (e.g., guest) can request to view listings of services for a particular location (e.g., San Francisco) that may include a listing for the first user's service. The first user may capture and upload images (e.g., photographs) corresponding to the service. For example, the first user may list an apartment in the online marketplace and upload images showing the kitchen, family room, bathroom, or other areas in the apartment that users interested in booking the apartment can view.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
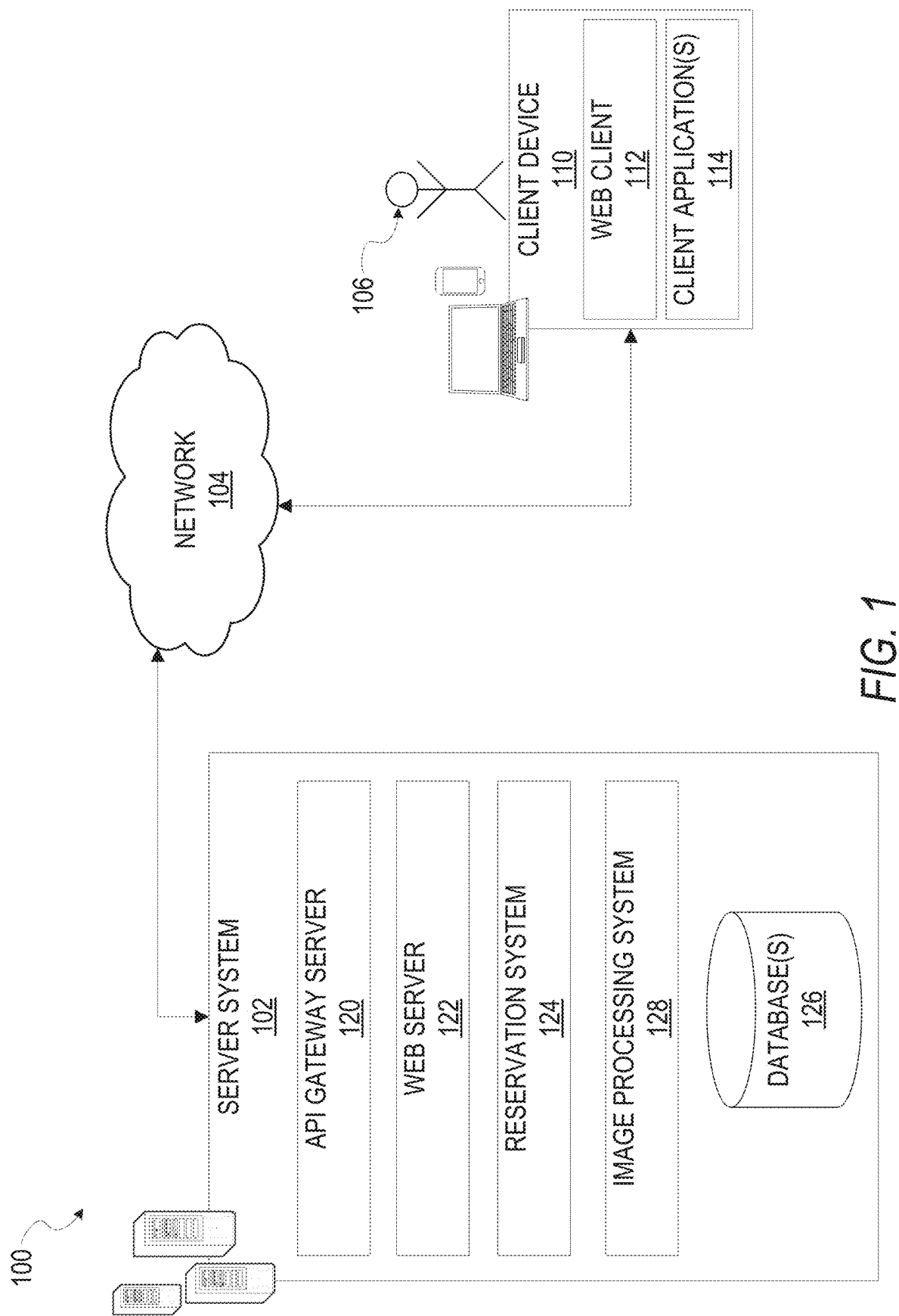
FIG. 1 is a block diagram illustrating a networked system, according to some example embodiments.

Systems and methods described herein relate to a dynamic image capture and processing system. As explained above, a user (e.g., host) that wishes to list a service, such as an accommodation, in an online marketplace may capture and upload images (e.g., photographs) corresponding to the service. For example, the user may list an apartment in the online marketplace and upload images showing the kitchen, family room, bathroom, or other areas in the apartment that users interested in booking the apartment can view via the online marketplace. However, there are many issues related to these user-provided images that cause inaccurate and incomplete data corresponding to the inventory of accommodations (or other services) in the online marketplace. For example, the images are often low quality (e.g., captured via a low-quality camera of a smart phone), the images may not capture all areas of interest in the accommodation, images may be incomplete, the images often become outdated (e.g., because amenities have changed or the accommodation has been remodeled and no new images have been uploaded), it is easy to create and upload fake images that do not represent the accommodations, and so forth. Moreover, it has been found that in such online marketplaces users searching for accommodations rely heavily on images for choosing the right accommodation, even when a textual description is provided. Thus, these issues also make it difficult for users to find the right accommodations and host.

Some of these issues may be addressed by using professional photography services, professional photography equipment, and/or personal visits by inspectors to view the accommodation; however, this is very expensive and not scalable in an online marketplace with millions of listings for accommodations across the world.

Example embodiments address such issues using a dynamic capture system that allows a user to use a readily-available camera device, such as a camera on the user's smartphone, to capture images of an accommodation quickly and easily. For example, a user can "scan" his home using a camera of his smart phone. In one example, a user can scan a two bedroom home in about fifteen minutes. Example embodiments display a three-dimensional (3D) reconstruction of the image data from the camera of the user's smart phone, detect amenities in the image data (e.g., refrigerator, oven, bed, couch, TV, etc.), can request further information about an amenity, can request the user take additional photographs of a missing amenity or for a specified area of the home, and so forth as described in further detail herein. The images and related data can then be uploaded to a server system of an online marketplace and used for listing the accommodation, evaluating the accommodation, and other functionality and services. For example, embodiments allow a user to capture images needed to list an accommodation or update a listed accommodation. Moreover, example embodiments provide a verified inspection report identifying how a space is laid out, where various amenities are located, and the like.

Systems and methods described herein further relate to generating a two-dimensional (2D) floorplan from three-dimensional (3D) image data of a space. In one example, a space is an accommodation, such as an apartment, a house, a cabin, and the like. A space can also be any building. A user may use a camera device, such as a camera on the user's smartphone, to capture images of the space. For example, the user can "scan" his apartment using the camera of his smart phone to generate and display a 3D reconstruction of the image data from the user's smart phone, as described above and in further detail below. The 3D image data from the scan can be sent to a server system to be stored and further processed. It is to be understood that this is one method of generating 3D image data and that other methods of generating 3D image data may be used in example embodiments.

Example embodiments utilize 3D image data to generate a 2D floorplan of the space. The 2D floorplan can indicate various rooms in the space, objects such as furniture and appliances that are located in the space, and so forth, as described in further detail below.

As explained above, a user may wish to list a service, such as an accommodation, in an online marketplace. It has been found that in such online marketplaces, users searching for accommodations rely heavily on visual data (e.g., images such as photographs of the space) for choosing the right accommodation, even when a textual description is provided. Moreover, layout and room size or proportion is important for planning an event in a space. It has also been found that people spend too much time trying to extract information about the overall space size and room proportion from images of the space.

Example embodiments provide a new way to view a space (e.g., accommodation) by utilizing 3D image data generated for the space to generate a 2D floor plan of the space. Example embodiments allow for an easy visual overview of the number of rooms in a space, the proportion and overall size of the rooms, possible sleeping arrangement for members of the party staying in the space, listing and display of amenities (e.g., furniture, appliances, bed type and size), a distance from a host's room to a private room, and so forth.

For example, a computing system accesses 3D image data of a space generated from image data derived from a scan of the space via a camera of a computing device. The 3D image data comprises a 3D mesh of the space comprising a plurality of vertices, and each vertex of the plurality of vertices has respective 3D coordinates within the space of the 3D mesh. The computing system generates a subset of the plurality of vertices comprising vertices that are within a specified height range and have a specified orientation, indicating walls of the space. The computing system generates a 2D grid corresponding to the 3D mesh, with the 2D grid having the same size and shape as an outer boundary of the 3D mesh, and then applies the subset of the plurality of vertices to the 2D grid, with each vertex of the subset of the plurality of vertices represented as a dot on the 2D grid based on an X and Y coordinate of the respective 3D coordinates. The computing system renders a 2D image of the space comprising an outer border corresponding to the size and shape of the 2D grid and indications of walls within the space based on the applied subset of the plurality of vertices.

FIG. 1 is a block diagram illustrating a networked system 100, according to some example embodiments. The system 100 may include one or more client devices such as a client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, Inertial Motion Unit (IMU), and so forth.

In some example embodiments, the camera of the client device 110 is used to collect raw imagery and related data (also referred to herein as "image data"). The camera captures images, such as photographs and video. In one example the camera provides RGB imagery information and optionally, depth information (e.g., RGB-D).

In one example, an IMU of the client device 110 can also be used to collect data related to the raw imagery, which can also be included in the image data used in example embodiments. An IMU is an electronic device comprising a sensor that measures angular rate, force, and sometimes magnetic field. An IMU can comprise an accelerometer and a gyroscope. An IMU often comprises additional technology to combine data from multiple sensors to provide measures of orientation and heading. An IMU can be used in a client device 110 to determine or track motion and orientation.

The client device 110 further comprises an operating system (OS) that provides the ability for the client device 110 to run applications, programs, and other functionality. In some example embodiments, the OS comprises an OS-level Visual Inertial Odometry (VIO) and other technology, such as technology to coordinate the system and provide rough depth maps (e.g., ARKit, ARCore), to track a space and where objects are located within the space. The OS-level VIO and other technology is typically used to enable augmented reality (AR) on a mobile device such as a smartphone. Data from OS-level VIO and other technology (e.g., technology the OS may employ to power AR experiences) can also be included in image data used in example embodiments. In one example, the computing device pose (e.g., position and orientation) described below is provided by the OS-level VIO and/or other technology.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., voice input, touch screen input, alphanumeric input, etc.) to the client device 110 and the input may be communicated to other entities in the system 100 (e.g., third-party servers, a server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The client device 110 may be a device of a user that is used to request and receive reservation information, accommodation information, and so forth. The client device 110 may also be a device of a user that is used to post and maintain a listing for a service (including capturing and uploading image data), request and receive reservation information, guest information, and so forth. The client device 110 may also be a device of a user that is used to evaluate, inspect, or provide feedback (e.g., design advice), and so forth for a service (e.g., accommodation).

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a reservation application, and the like.

In some embodiments, one or more client applications 114 may be included in a given one of the client devices 110 and configured to locally provide the user interface and at least some of the functionalities, with the client application 114 configured to communicate with other entities in the system 100 (e.g., third-party servers, the server system 102, etc.), on an as-needed basis, for data and/or processing capabilities not locally available (e.g., to access reservation or listing information, to request data, to authenticate a user 106, to verify a method of payment, etc.). Conversely, one or more client applications 114 may not be included in the client device 110, and then the client device 110 may use its web browser to access the one or more applications hosted on other entities in the system 100 (e.g., third-party servers, the server system 102, etc.).

The server system 102 may provide server-side functionality via the network 104 (e.g., the Internet or a wide area network (WAN)) to one or more third-party servers and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace. The online marketplace may provide various listings for services, such as accommodations hosted by various managers (also referred to as "owners" or "hosts") that can be reserved by clients (also referred to as "users" or "guests"), such as an apartment, a house, a cabin, one or more rooms in an apartment or house, and the like. As explained above, the online marketplace may further provide listings for other services, such as experiences (e.g., local tours), car rental, flights, public transportation, and other transportation or activities (e.g., related to travel).

The server system 102 includes the API gateway server 120, a web server 122, a reservation system 124, and an image processing system 128 that may be communicatively coupled with one or more databases 126 or other forms of data store.

The one or more databases 126 may be one or more storage devices that store data related to the reservation system 124 and other systems or data. The one or more databases 126 may further store information related to third-party servers, third-party applications, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage, in some embodiments.

The image processing system 128 provides functionality to receive image data from one or more client devices (e.g., images of an accommodation and related data (e.g., 3D reconstruction data, image frames, pose of the device (e.g., position (x, y, z) and orientation (roll, pitch, yaw)) for image frames, etc.)), and to perform various processing on the image data, as described in further detail below.

The reservation system 124 manages resources and provides back-end support for third-party servers, third-party applications, client applications 114, and so forth, which may include cloud-based applications. The reservation system 124 provides functionality for viewing listings related to trip items (e.g., accommodation listings, activity listings, etc.), managing listings, uploading images for listings, booking listings and other reservation functionality, and so forth, for an online marketplace. Further details related to the reservation system 124 are shown in FIG. 2.

Figure 2:
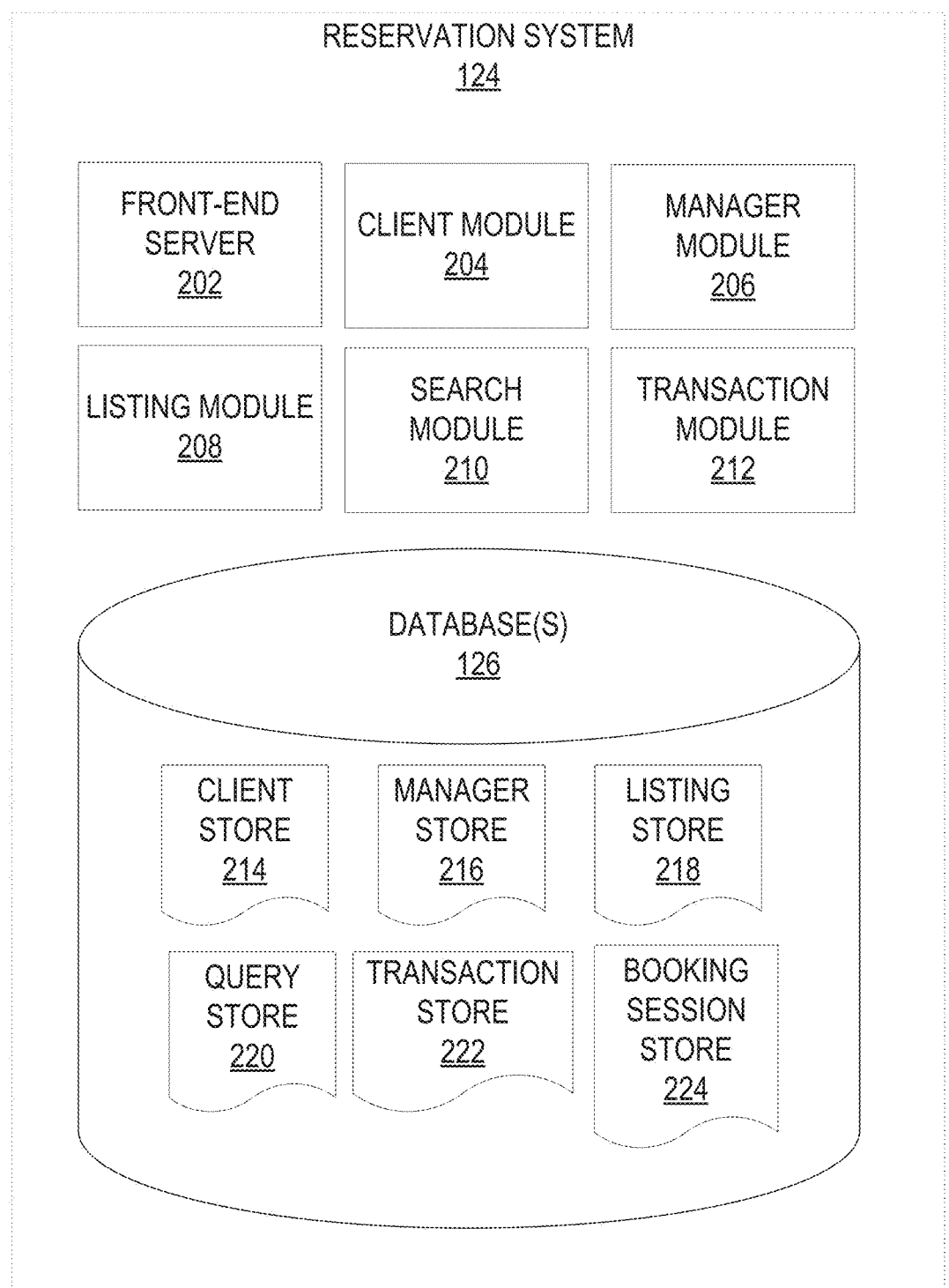
FIG. 2 is a block diagram illustrating a reservation system, according to some example embodiments.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 may be implemented using a single computing device or a network of computing devices, including cloud-based computer implementations. The computing devices may be server-class computers including one or more high-performance computer processors and random access memory, which may run an operating system such as Linux or the like. The operations of the reservation system 124 may be controlled either through hardware or through computer programs installed in non-transitory computer-readable storage devices such as solid-state devices or magnetic storage devices and executed by the processors to perform the functions described herein.

The front-end server 202 includes program code that allows client and manager client devices 110 to communicate with the reservation system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents, such as a web browser software application, may be installed on the client devices 110 and can send commands to and receive data from the reservation system 124. The front-end server 202 may also utilize the API gateway server 120 that allows software applications installed on client devices 110 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client identifier (ID) and client profile, both of which are stored in the client store 214.

The client profile includes a number of client-related attribute fields that may include a profile picture and/or other identifying information, a geographical location, a client calendar, and so forth. The client's geographical location is either the client's current location (e.g., based on information provided by the client device 110), or the client's manually entered home address, neighborhood, city, state, or country of residence. The client location may be used to filter search criteria for time-expiring inventory relevant to a particular client or to assign default language preferences.

The client module 204 provides program code for clients to set up and modify the client profile. The reservation system 124 allows each client to exchange communications, request transactions, and perform transactions with one or more managers.

The manager module 206 comprises program code that provides a user interface that allows managers (also referred to herein as "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216.

The manager profile is associated with one or more listings owned or managed by the manager and includes a number of manager attributes including transaction requests and a set of listing calendars for each of the listings managed by the manager.

The manager module 206 provides program code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other users.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and description that characterize the inventory; and any other relevant information. For example, for an accommodation reservation system, a listing may include a type of accommodation (e.g., house, apartment, room, sleeping space, or other), a representation of its size (e.g., square footage, or number of rooms), the dates that the accommodation is available, and a price (e.g., per night, per week, per month, etc.). The listing module 208 allows a user 106 to include additional information about the inventory, such as videos, photographs, and other media.

The geographical location associated with the listing identifies the complete address, neighborhood, city, and/or country of the offered listing. The listing module 208 is also capable of converting one type of location information (e.g., mailing address) into another type of location information (e.g., country, state, city, and neighborhood) using externally available geographical map information.

The price of the listing is the amount of money a client needs to pay in order to complete a transaction for the inventory. The price may be specified as an amount of money per day, per week, per month, and/or per season, or per another interval of time specified by the manager. Additionally, the price may include additional charges such as cleaning fees, pet fees, service fees, and taxes, or the listing price may be listed separately from additional charges.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a time period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory, etc.). Information from each listing calendar is stored in the listing store 218.

Figure 3:
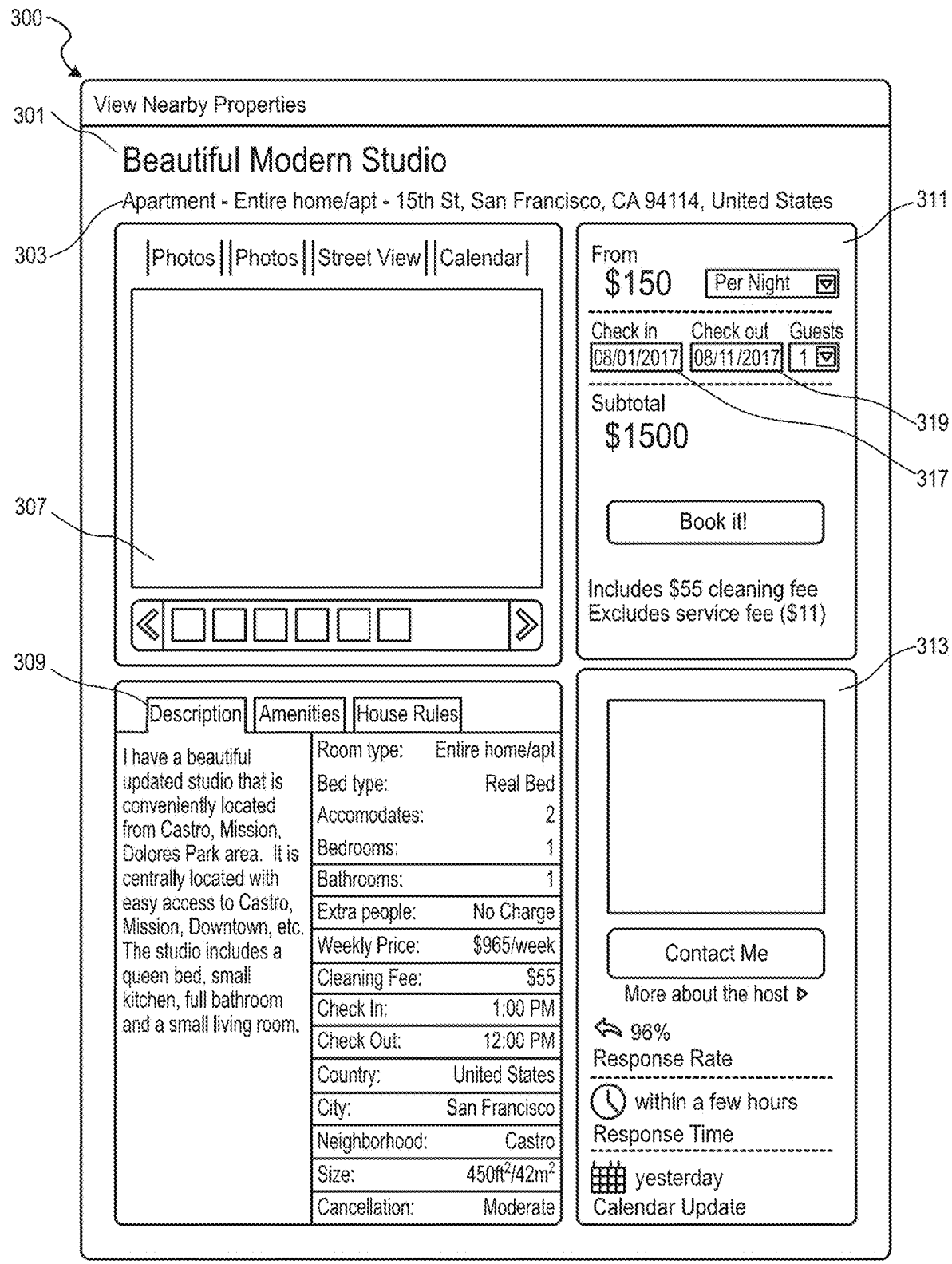
FIG. 3 illustrates an example user interface displaying an example listing for an accommodation, according to some example embodiments.

FIG. 3 illustrates an example user interface 300 for a description of a listing for a service (e.g., an apartment in San Francisco) in an online marketplace. The example listing shown in FIG. 3 is for accommodations in San Francisco. In other examples, the listing could be for a tour, local experience, transportation, or other service. The listing may include a title 301 and a brief description 303 of the service. The listing may further include photos of the service, maps of the area or location associated with the service, a street view of the service, a calendar of the service, and so forth, which may be viewed in area 307. The listing may include a detailed description 309, pricing information 311, and the listing host's information 313. The listing may further allow a user to select a date range for the service by entering or choosing a specific check-in date 317 and check-out date 319.

Returning to FIG. 2, the search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively, which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book or reserve a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide managers and clients with the ability to exchange informal requests to transact. Informal requests are not sufficient to be binding upon the client or manager if accepted, and in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Any one or more of the modules or components described herein may be implemented using one or more processors (e.g., by configuring such one or more processors to perform functions described for that module) and hence may include one or more of the processors. Any one or more of the modules described may be implemented using hardware alone (e.g., one or more of the processors of a machine) or a combination of hardware and software. For example, any module described of the reservation system 124, image processing system 128, or other systems described herein may physically include an arrangement of one or more of the processors (e.g., a subset of or among the one or more processors of the machine) configured to perform the operations described herein for that module. As another example, any module of the reservation system 124, image processing system 128, or other systems described herein may include software, hardware, or both, that configure an arrangement of one or more processors (e.g., among the one or more processors of the machine) to perform the operations described herein for that module. Accordingly, different modules of the reservation system 124, image processing system 128, or other systems described herein may include and configure different arrangements of such processors or a single arrangement of such processors at different points in time. Moreover, any two or more modules of the reservation system 124, image processing system 128, or other systems described herein may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
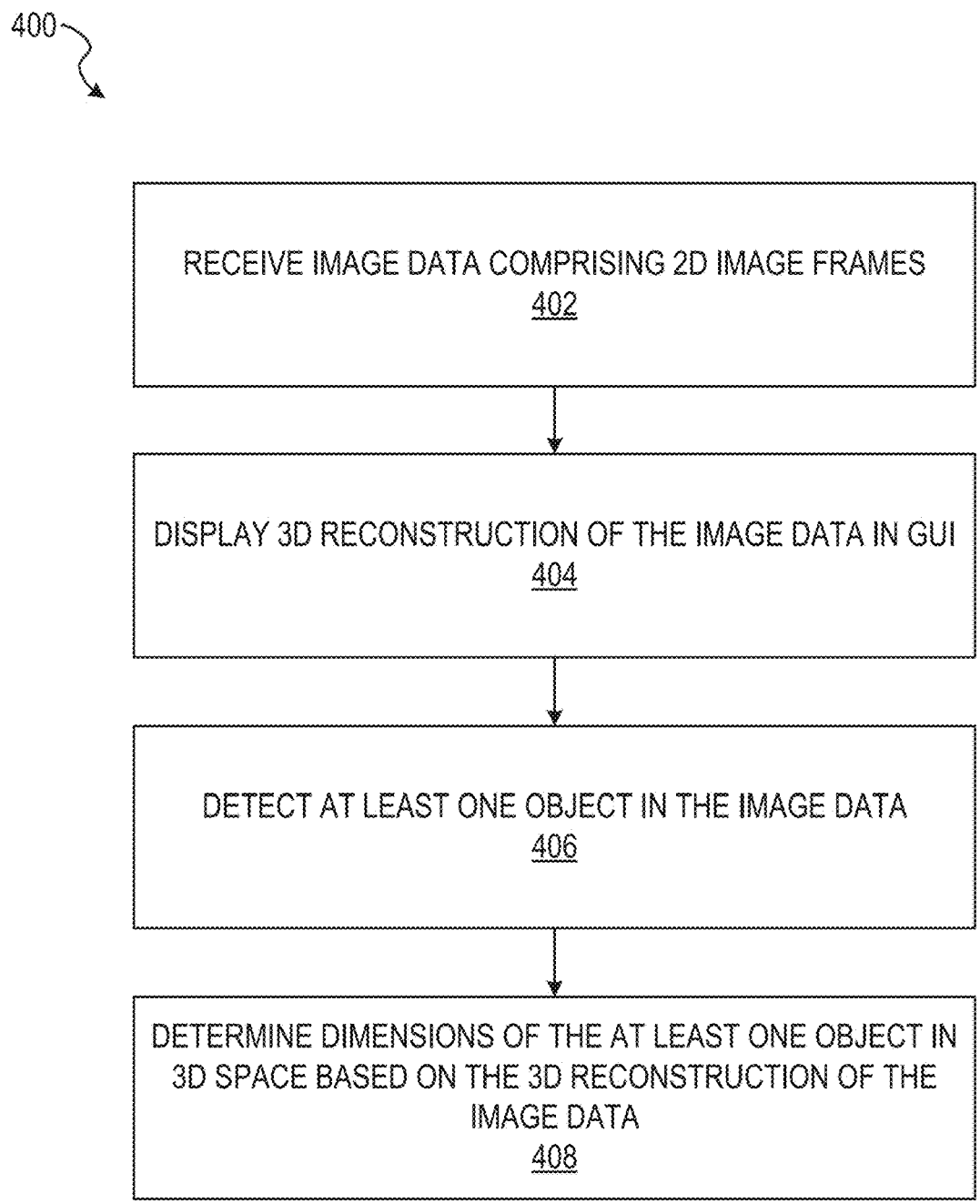
FIG. 4 is a flow chart illustrating aspects of a method, according to some example embodiments.

FIG. 4 is a flow chart illustrating aspects of a method 400 for dynamic image capture and processing, according to some example embodiments. For illustrative purposes, the method 400 is described with respect to the networked system 100 of FIG. 1. It is to be understood that the method 400 may be practiced with other system configurations in other embodiments.

In operation 402, a computing device (e.g., client device 110) receives image data via a camera of the computing device. In one example the image data comprises raw imagery and related data (e.g., from an IMU, OS-level VIO, or related technology, as explained above) and comprises a plurality of image frames.

For example, a user may wish to list a home on the online marketplace so other users can book dates to stay in the home. The online marketplace may provide a client application 114, such as a reservation application, that allows the user to provide information about the home, upload images (e.g., photographs and video), indicate dates the home is available for booking, and the like, as described above, to be included in a listing for the home in the online marketplace. The user may use the application on his mobile device, such as his smartphone. In one example, the client application 114 may request that the user do a "home scan" using the client application 114 on the mobile device, to generate image data for the home. The image data can be used to generate images and video for the listing, identify amenities in the listing, to evaluate the listing for elevated status, and so forth.

In one example, the online marketplace provides elevated status for a subset of listings that meet specified criteria. For example, the elevated status may be for a selection of only the highest quality accommodations with hosts that are known for great reviews and attention for detail. The specified criteria may comprise a 100+ point quality inspection to be sure the listing qualifies for the elevated status. To be sure an accommodation meets specified criteria for the elevated status, an individual associated with the online marketplace can visit the accommodation in person to spend several hours to assess each accommodation, take high quality photographs or video, meet with the host, and so forth. It is not possible, however, to individually visit every accommodation with the potential for elevated status in an online marketplace with millions of listings worldwide. Moreover, specialized equipment is very costly and may require certain expertise to operate.

Figure 5:
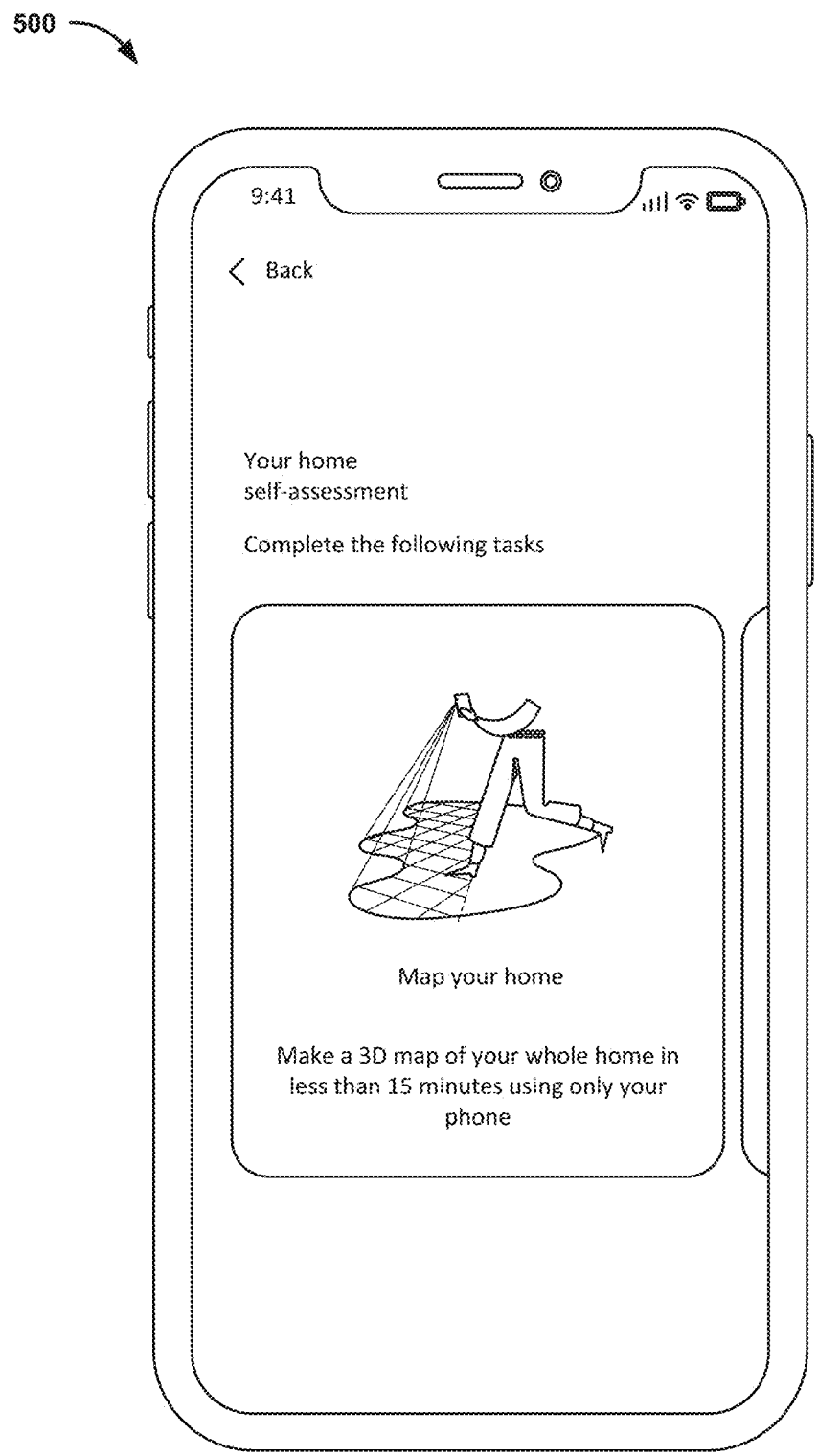
FIGS. 5-13 illustrate example graphical user interfaces (GUIs), according to some example embodiments.
Figure 6:
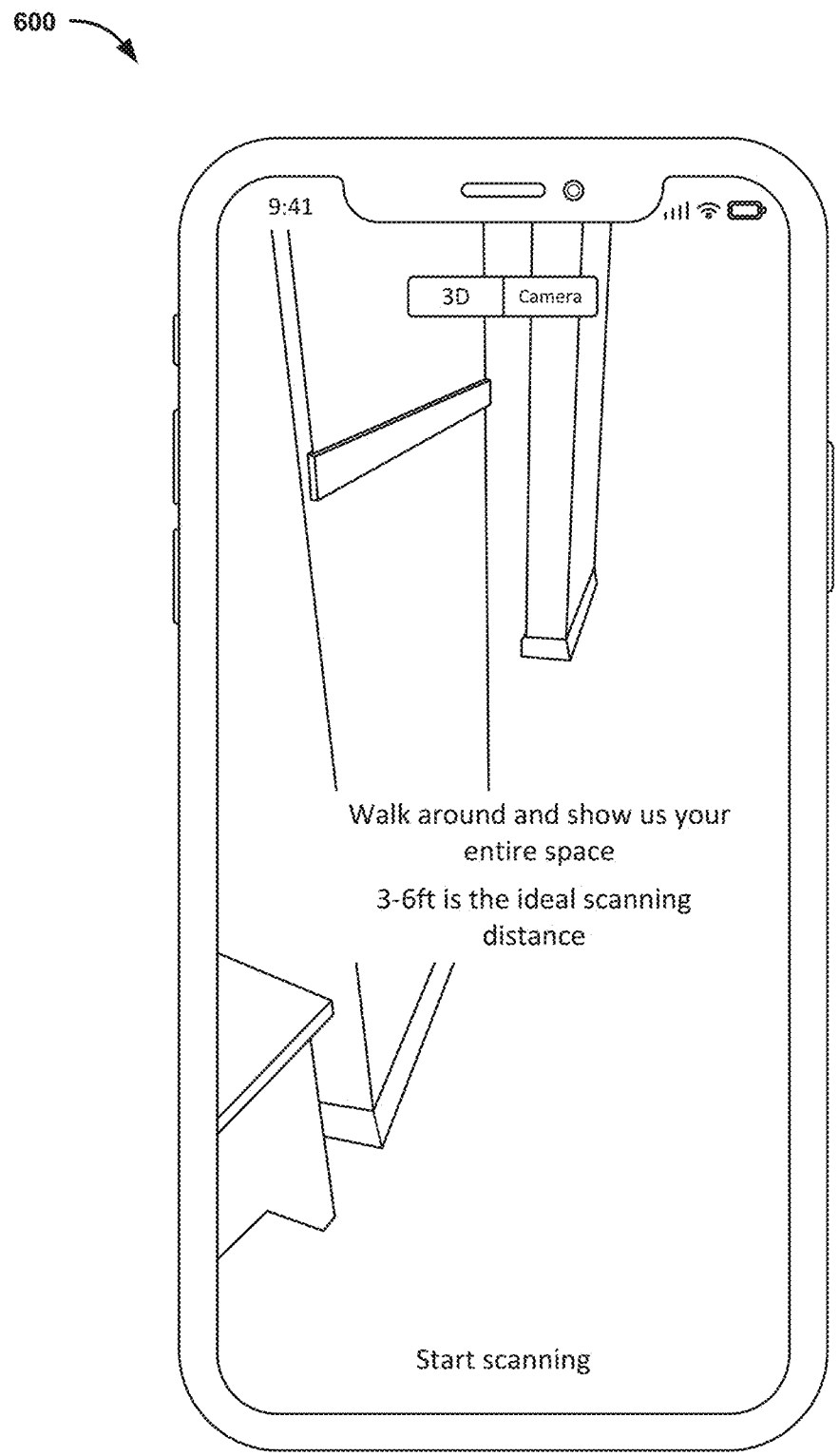

Example embodiments allow a user to use a common computing device (e.g., client device 110), such as a smart phone, to scan the accommodation (e.g., the "space") using a camera of the computing device to generate a 3D map of the space. FIG. 5 illustrates an example graphical user interface (GUI) 500 indicating that a user can make a "map" of his space. FIG. 6 illustrates an example GUI 600 with instructions 602 for the user on how to scan the space and a selection option 604 to start scanning the space. Once the user selects "Start Scanning," the computing device starts capturing image data using the camera of the device, and other related technology (e.g., IMU, OS-level VIO, etc.). While the user is scanning his space, the computing device is receiving the image data (e.g., comprising a plurality of image frames) and generating a 3D reconstruction of the image data. The 3D reconstruction can be generated using any 3D reconstruction technology (e.g., augmented stereo reconstruction technology, mesh reconstruction technology, photogrammetry, neural net-based depth estimation algorithms, etc.). Generating the 3D reconstruction comprises generating a 3D mesh of the space and textures of the space (e.g., images mapped to the 3D mesh). In one example, the 3D reconstruction is generated in real time as the user is scanning the space.

The computing device uses the generated 3D mesh and textures to display, in real time (or near real time), what is being captured in the scan. Returning to FIG. 4, the computing device displays the 3D reconstruction of the image data on a GUI displayed on the computing device, as shown in operation 404, as image data is received and a 3D reconstruction of the image data is generated. For example, the computing device translates the 3D mesh and textures into two dimensions that can be displayed in a GUI on the display of the computing device to indicate which areas of the space have been scanned (e.g., for which image data has been captured). In one example, the display is based on the computing device's position in the space so that the user can view the 3D model being created as he moves the device and/or walks around the space. In one example, displaying the 3D reconstruction of the image data on the GUI comprises displaying at least a first area in the GUI to indicate at least one area for which image data has not yet been captured by the camera of the computing device and at least a second area of the GUI to indicate at least a second area for which image data has been captured by the camera of the computing device. This provides feedback to the user so that he knows which areas have been scanned already, and which still need to be scanned.

Figure 7:
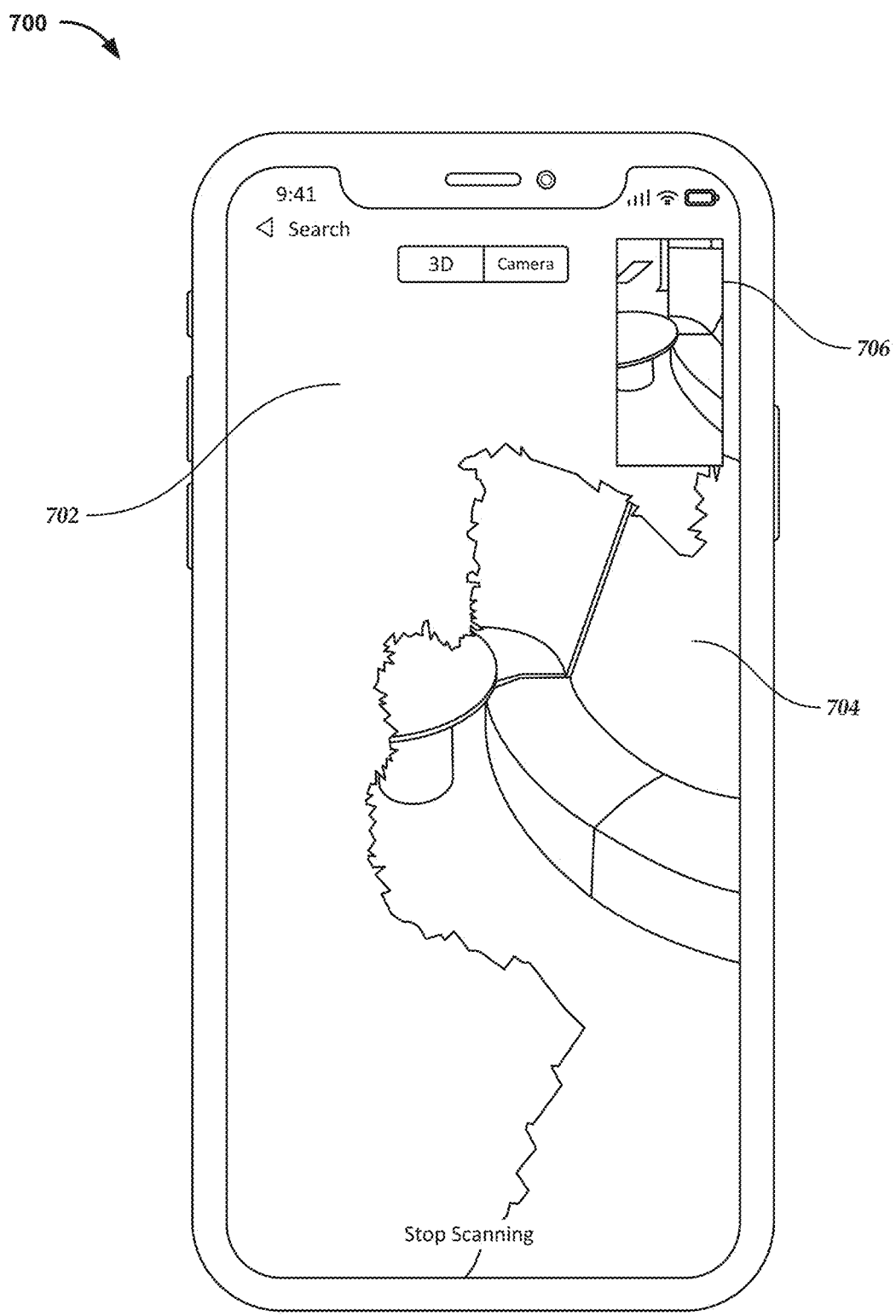
Figure 14:
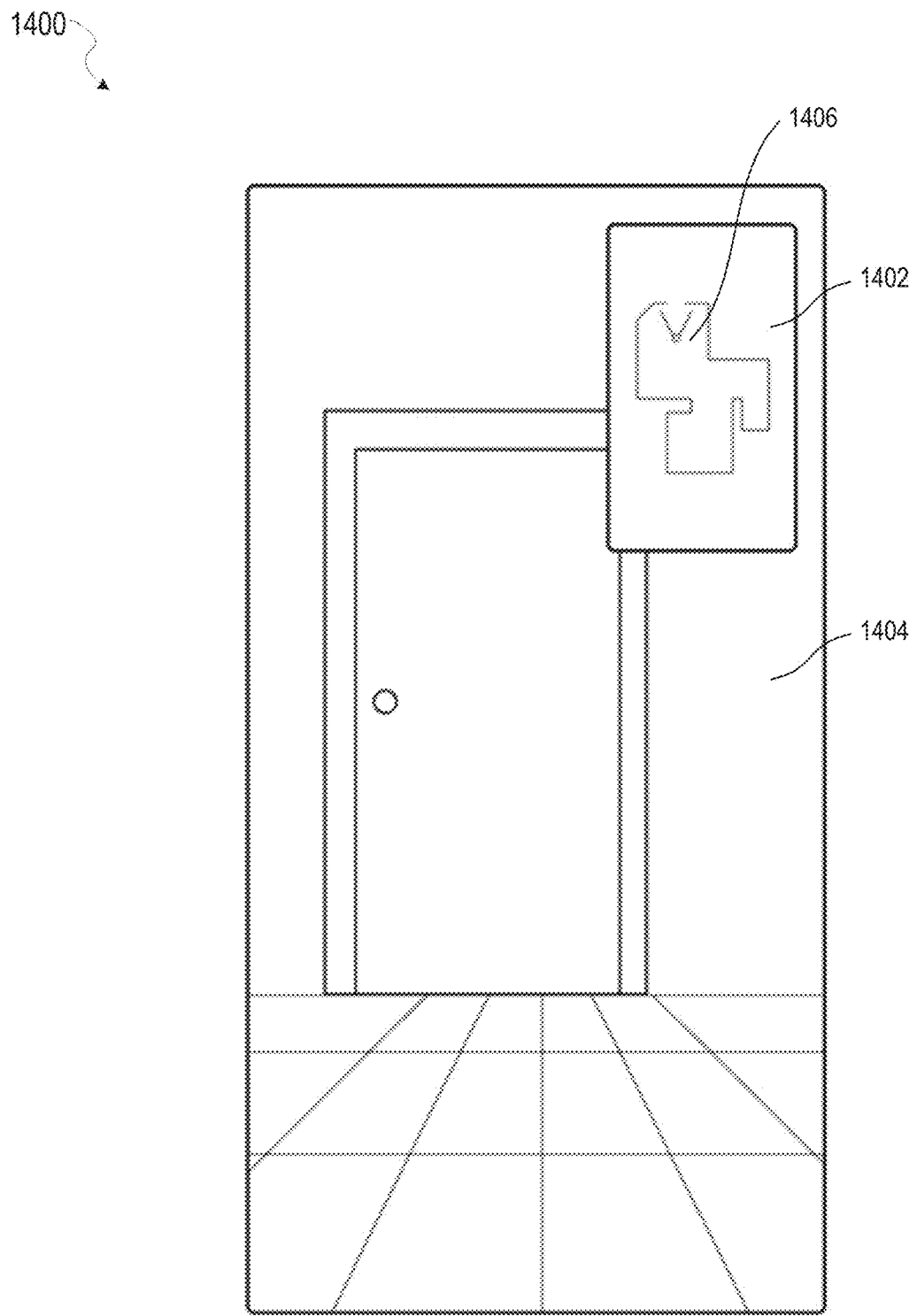
FIG. 14 illustrates an example GUI, according to some example embodiments.

FIG. 7 illustrates an example GUI 700 of a computing device that shows a small view through the camera 706 on the GUI 700 and a larger view (e.g., comprising the rest of the GUI 700) indicating one or more areas (e.g., 704) of the space for which image data has been captured, and one or more areas (e.g., 702) for which image data has not yet been captured. For example, the one or more areas of the space for which image data has not been captured may appear blank (e.g., in a white, black, grey or other muted or faded color), and the one or more areas for which image data has been captured may appear in color showing images corresponding to the areas captured. In this example, the view indicating areas that have been captured is shown in a third-person isometric representation. It is to be understood that other techniques for displaying the captured data and other representations (e.g., camera overlay, top-down floorplan representations) can be used in example embodiments. For example, a "mini-map" can be displayed to a user showing a top-down floorplan representation that indicates which areas or rooms for which image data has been or had not been captured. FIG. 14 illustrates an example GUI 1400 showing a top-down floor representation 1402 that indicates a location of a user 1406. The small circle represents the user and the two lines extending from the circle represent the area the user is currently capturing in the scan of the space. The top-down floor representation 1402 may initially start out from nothing (e.g., blank) and then fill out as the computing device receives image data and generates a 3D representation of the image data to indicate the user progress through the scan of the home. The view 1404 may be a regular camera view (e.g., displaying a view through the camera as the user is scanning the space) or could be a view 704 similar to what is shown and described for FIG. 7.

As the user walks around and/or moves the computing device to scan the space, the computing device displays what has been scanned and indicates what has not been scanned, regardless of the order or direction in which the user is scanning the space. The display of the 3D reconstruction of the image data on the GUI displayed on the computing device as image data is received and 3D reconstruction of the image data is generated, providing feedback to the user so that he knows which areas he has already scanned and which areas he still needs to scan.

In one example, the computing device stores image frames throughout the space (e.g., as the image data is received) to be sure that image frames are stored to capture the space. For example, the computing device may store all image frames of the received image data. In another example, to conserve storage space, processing power, and network bandwidth, the computing device may only store select image frames. For example, the computing device may store image frames every second, every few feet, based on objects of interest, or other parameters, as described below with respect to how often the computing device evaluates the image frames for object detection.

The computing device may store the image frames and pose of the computing device during capture of each select image frame. As also explained below with respect to object detection, select image frames may be discarded (e.g., not saved) based on blur detection, duplicates (e.g., based on dimensions of a current select image frame that is similar to a previously stored select image frame), and so forth. In another example, instead of discarding the image frames based on blur detection duplicates, and so forth, the select images may still be stored and associated with further information about blur, duplicates, and so forth, so that the image frames may be further processed (e.g., at a server system 102 or image processing system 128) when storing the image frames (e.g., by sending the stored image frames to the server system 102 or image processing system 128) or later, if desired.

Returning to FIG. 4, in operation 406, the computing device detects one or more objects in the image data. For example, while the user is scanning the space, the computing device is also evaluating image frames of the image data for object detection. In one example, the computing device detects, in the image data, one or more objects corresponding to one or more of a plurality of predefined object types (e.g., amenities). For example, the computing device detects one or more objects corresponding to predefined amenities, such as a refrigerator, an oven, a microwave, a dishwasher, a clothes washer, a clothes dryer, a couch, a table, a desk, a sofa, a coffee table, a coffee maker, a toaster, a bed, a dresser, a toilet, a bathtub, a shower, a television, a computer, a window, a door, a smoke detector, a chair, a pan, a tea kettle, a cutting board, utensils, and so forth.

In one example, the computing device evaluates each image frame in the image data. It may be desirable, however, to only evaluate select image frames so as not to overtax the processing power of the computing device and cause any lag in display of the scanned image data. For example, the computing device may evaluate select frames based on one or more specified parameters, such as spatial parameters, temporal parameters, one or more objects of interest in an image frame, or other parameter or method, and skip image frames that do not fall into the specified parameters. For example, the computing device evaluates an image frame every few inches or feet (e.g., six inches, 2 feet), or other spatial parameter. In another example, the computing device evaluates an image frame every second, every few seconds, or other temporal parameter. In yet another example, the computing device makes a more frequent evaluation of image frames when an object of interest is detected in an image frame. In example embodiments, the parameters for storing the image frames and evaluating the image frames for object detection may be the same or may be different.

The computing device may also use a combination of these or other parameters to determine how often to evaluate the image frames. For instance, if a computing device is evaluating a image frame every three seconds or every two feet and detects an object of interest (e.g., an object corresponding to a predefined object type or an object corresponding to a select predefined object type of a plurality of object types) in a image frame, the computing device may start evaluating every frame, image frames every second, image frames every few inches, or the like. Once the object of interest is no longer detected, the computing device may return to the previously specified parameter(s).

In another example, the computing device may determine whether the same object has already been detected. For example, each object type may be associated with a minimum dimension size. For instance, a keyboard may have a minimum dimension of twelve inches, a refrigerator may have a minimum dimension of thirty inches, and so forth. Example embodiments use the minimum dimension size to determine whether the image frame comprises an object that corresponds to an image frame for which the same object was already detected. For instance, the computing device detects a refrigerator in a current image frame and determines that a refrigerator was already detected in a previous image frame. The computing device can determine the position of the refrigerator in 3D space (e.g., based on the 3D reconstruction of the image data, as explained below) and determine whether the refrigerator of the current image frame is the same as the refrigerator of the previous image frame, based on the minimum dimensions associated with a refrigerator. For example, if the position in 3D space of the refrigerator in the current image frame is within thirty inches of the position in 3D space of the refrigerator in the previous image frame, it is likely the same refrigerator and thus, the image frame can be associated with the previously detected object (e.g., the refrigerator). In one example, the computing device may disregard the duplicate image frame for the refrigerator (e.g., not associate the duplicate image with the previously detected object). In one example, the computing device chooses which image frame to disregard based on other factors such as blur, angle, distance of the camera from the object, and so forth. In this example, the computing device may only associate, with the detected object, image frames of a certain type, quality, or the like.

In one example, a multiplier is used on the minimum size for an object type. For example, a multiplier of two may be used such that a minimum size for a refrigerator (e.g., thirty inches) is doubled to be sixty inches. This approach may potentially cause more duplicate image frames for the same object (or cause the same object to be detected more than once but may lower the chances that an object is missed or skipped.

It is to be understood that the previous image frame may be any previous image frame in the scan of the space. For example, the user may scan a kitchen portion of the space and then a living room portion and then come back and finish scanning the kitchen portion. Since the computing device can determine the position of an object or image frame in 3D space, the computing device does not need to track any order of image data capture for object detection.

In one example, the computing device detects the one or more objects of interest using a machine learning model trained to detect objects in an image. An example machine learning model that can be used comprise ssd mobilenet v2, and the like, which can be trained on publicly available datasets such as COCO or ImageNet dataset, or on custom datasets created for the purpose of the dentification of particular objects of interest. In example embodiments, the machine learning model is trained on numerous amenities, such as appliances, chairs, refrigerators, forks, toilets, and so forth.

To detect an object, an image (e.g., the image frame) is input into the machine learning model and the machine learning model outputs an object class corresponding to a predefined object type (e.g., refrigerator, sofa, toilet) and a confidence level (e.g., a value indicating a confidence score between 0 and 1) that the object detected is indeed the predefined object type. The machine learning model may further output a bounding box, segmentation mask, or other means for denoting the location of the object within the image frame. A bounding box is used herein to describe to describe example embodiments, but it is to be understood that other means for denoting the location of the object within the image frame may be used in example embodiments.

The computing device may analyze or evaluate the confidence level to determine if it meets a predefined threshold value (e.g., 0.7). For example, if an output from the machine learning model is an object class for a bed, and the confidence level is 0.3 and the predefined threshold is 0.7, the computing device does not do any further evaluation of the image frame and may discard or disregard the image frame and not log or store the amenity. For example, the computing device does not flag a bed amenity as found (in this instance) and does not store any pointer to an image frame for the bed amenity for this instance. If the output from the machine learning model is the object class of the bed and the confidence level is 0.8, the computing device may further evaluate the image frame. In one example, a different threshold can be set for and associated with different object types. For example, a threshold for 0.7 may be set for a bed and a threshold for 0.5 may be set for a nightstand.

If the confidence level meets the predefined threshold value (e.g., is a value equal to or greater than 0.7), the computing device may evaluate the size of the bounding box to determine whether the image frame should be associated with the found amenity. For instance, if the area or size of the bounding box (e.g., size in 3D space) is very small (e.g., based on a number of pixels or other measure), the image may be discarded because the area may be too small to actually show such an object, the machine learning model may have been inaccurate, or another reason. A threshold size of the bounding box may be used for all object types, a threshold size of the bounding box may be set differently for each object type, and so forth. In one example, the computing device determines the size of the bounding box and compares the determined size to the threshold size for a bounding box to determine whether to associate the image frame with the found amenity or whether to log the found amenity.

In one example, the computing device determines whether the object in the image frame is blurry. For example, the computing device analyzes the speed of the computing device and the computing device's rotational velocity (and/or other image data) to determine whether the image is too blurry to clearly depict the object. For instance, the computing device may compare the computing device's speed and rotational velocity against threshold values for each criterion and determine whether each criterion exceeds the threshold values. If the criteria exceed the threshold values, the image frame is considered too blurry to be useful. The image frame may be discarded or disregarded, or the image frame may be stored with an indication that it needs image processing to sharpen the image. The computing device may still store an indication that the object was detected even if the image frame is deemed blurry (e.g., to indicate that a particular amenity is present in the space).

Once the computing device has detected the at least one object in the image data (and determined it should be logged), at operation 408, the computing device determines dimensions of the at least one object in 3D space. For example, the computing device can use the 3D reconstruction of the image data to determine the dimensions of the at least one object in 3D space (e.g., the position of the amenity in the 3D model of the home). In another example, the computing device can use OS-level depth map information to determine the dimensions of the at least one object in 3D space.

Figure 8:
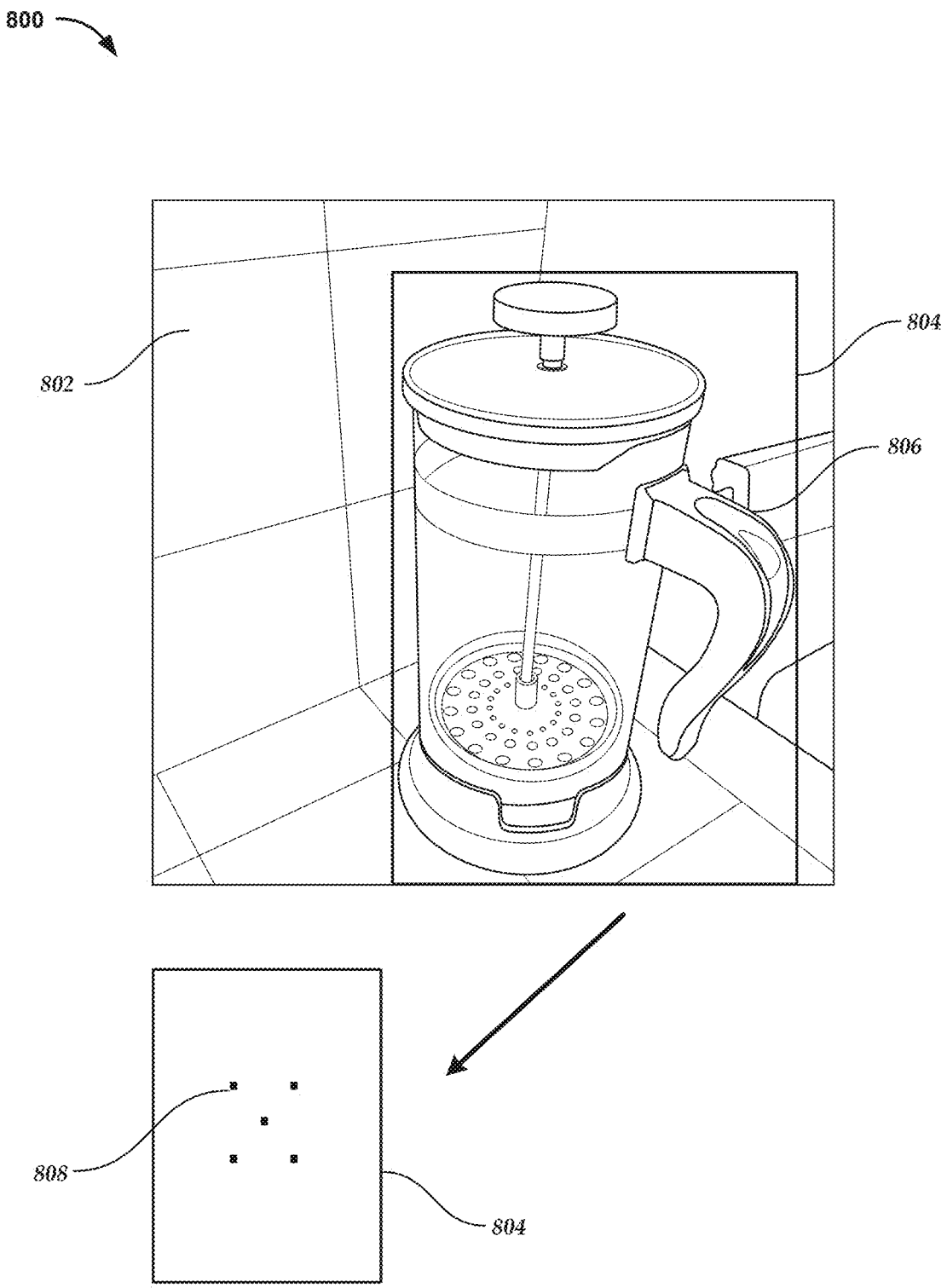

FIG. 8 illustrates an example image frame 802 with a bounding box 804 around a detected object 806. In one example, the computing device identifies one or more points in the bounding box. For example, the computing device identifies five points 808 in the bounding box 804 (shown below the image frame 802 to make it easier to see the points 808) corresponding to the at least one object 806 in the image frame. In this example there are five points 808 in a center area of the bounding box 804. It is to be understood that more points or fewer points may be used and that the points may be in different locations, in example embodiments. The number and position of the points may be predefined (e.g., based on determining that one or more positions of the point(s) results in more accurate dimensions of the object).

The computing device determines a 3D position for each of the plurality of points based on the 3D reconstruction of the image data. For example, the computing device may use ray casting or hit testing technology that projects each point out perpendicularly (e.g., at a right angle projection) from the device until it "hits" the object in the 3D model and then determines the dimensions of the point where it "hit" in the 3D model. For example, the computing device determines the X, Y, and Z dimensions of the point where it "hit" the 3D model. If the computing device is using more than one point in the bounding box (e.g., five points), the computing device averages the 3D dimensions (e.g., the X, Y, and Z dimensions of each point) to generate an averaged 3D position as the determined dimensions for the object. The computing device may further determine the pose of the computing device, which comprises the position and orientation of the computing device when capturing the image frame.

In one example, if the computing device cannot determine the dimensions for more than a threshold number of points (e.g., 3 out of five), then the results will be discarded, and the position will not be logged for the image frame and detected object. In another example, if the computing device determines that the dimensions of the different points are more than a threshold distance away from each other (e.g., five inches, one foot), the computing device may determine the dimensions are inaccurate, the results will be discarded, and the position will not be logged for the image fame and detected object. In another example, the computing device discards outlier points and logs the amenity and determine the location of the amenity based on the remaining points.

In one example, the computing device stores the detected object with the dimensions of the detected object (e.g., the dimensions comprising X, Y, and Z coordinate indicating the position of the at least one object in 3D space, pose indicating the position and orientation of the computing device when capturing the image frame comprising the object), and other data, and associates the detected object with one or more image frames that comprises the detected object (e.g., unique identifiers associated with the one or more image frames). The computing device may further store the generated bounding box for the detected object. For example, each detected object is stored in a separate data structure with the corresponding dimensions, any generated bounding box, and one or more image frames comprising the detected object (e.g., pointers to the one or more image frames, such as unique identifiers associated with one or more image frames), and other data corresponding to the detected object.

Figure 9:
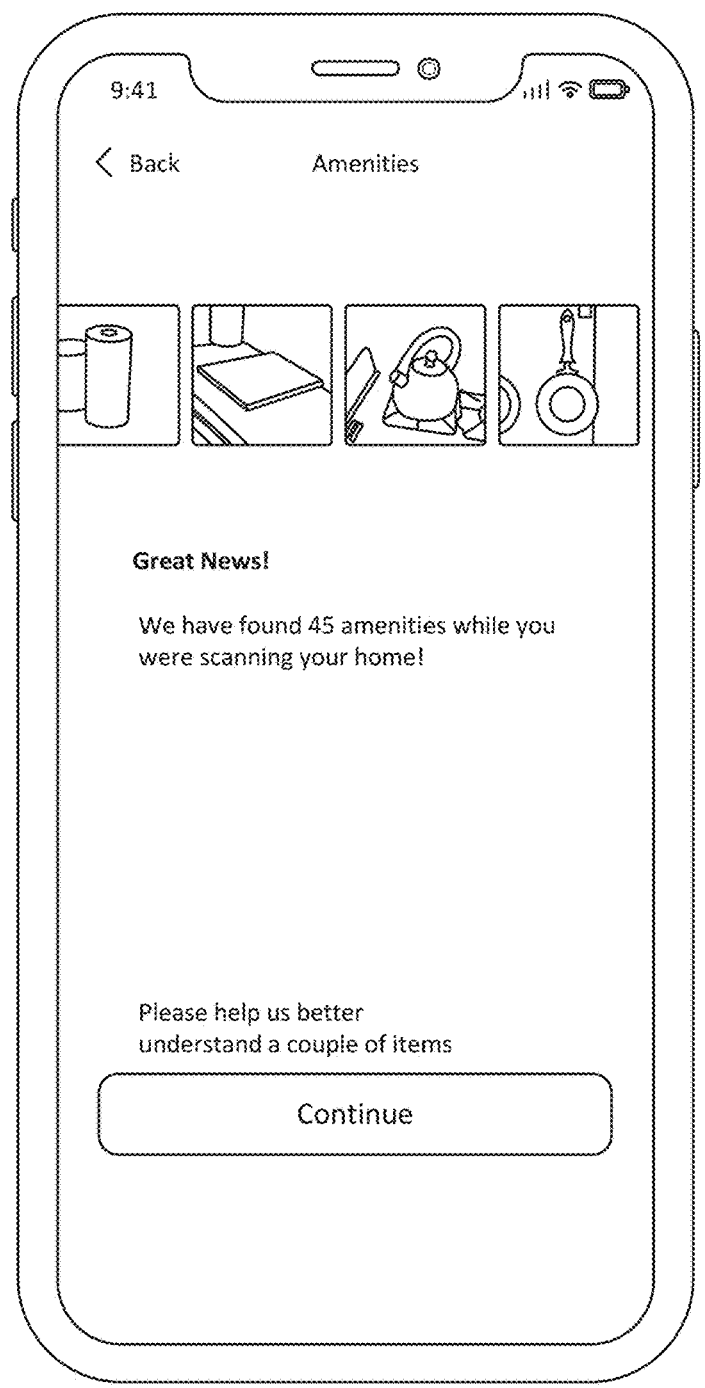
Figure 10:
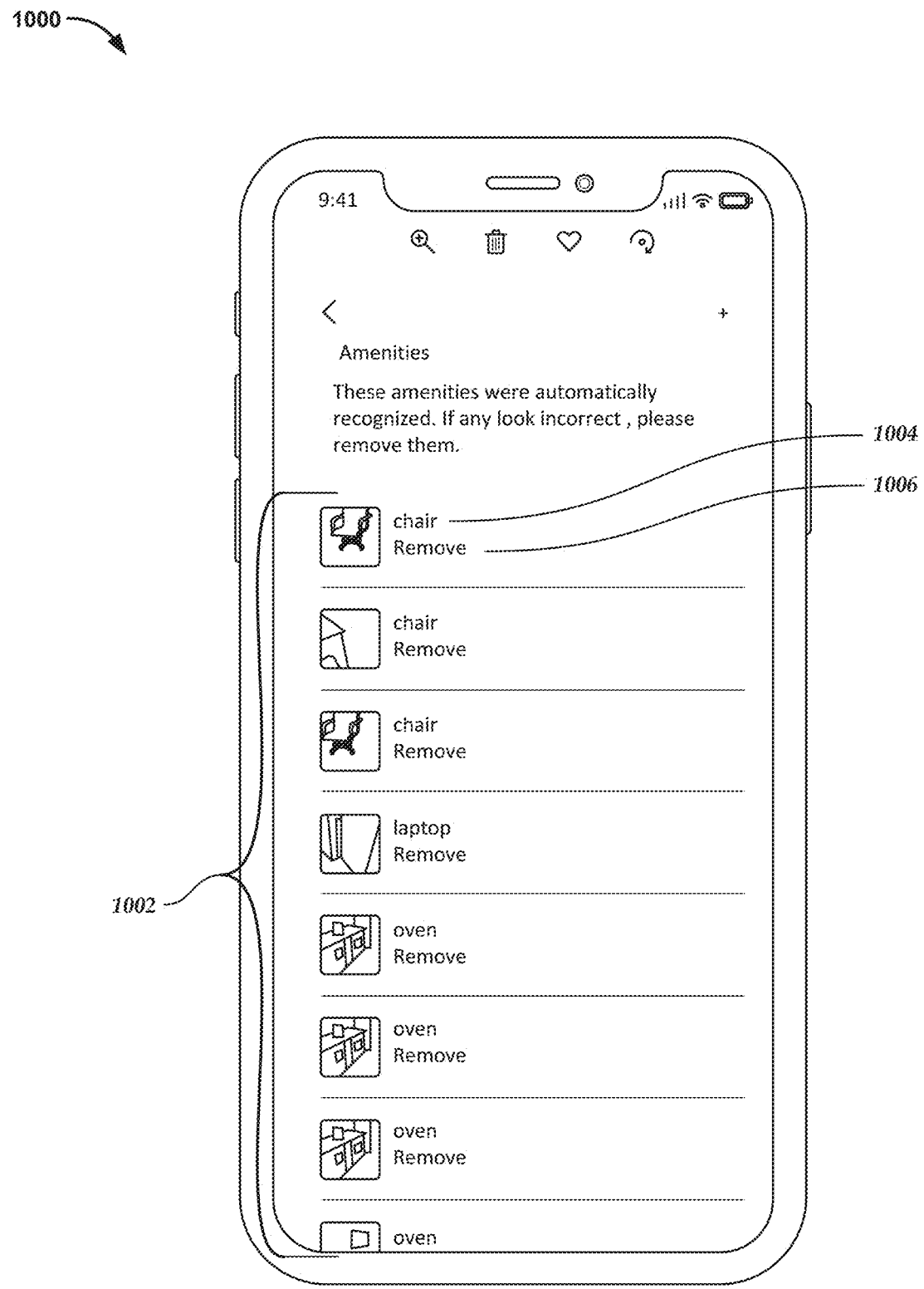

In one example, once the user finishes scanning the space, the computing device displays one or more objects that were detected, in a GUI displayed on the computing device. For example, the computing device may display a GUI indicating that the computing device has found a number of amenities during the user's scan of the space, as shown in FIG. 9. FIG. 10 illustrates an example GUI 1000 that shows a list 1002 of amenities that were found during the scan. Each amenity in the list may have a type or name (e.g., 1004) and any associated image (e.g., 1006). The associated image may be the image frame comprising the object, or a cropped version of the image frame comprising the object. For example, the image frame may be cropped using the bounding box of the object. The user may remove or edit the list or any individual amenity.

In one example, the computing device may determine one or more object type of the plurality of predefined object types that is not detected in the image data and request that the user provide information for the one or more object type that is not detected. For example, the computing device may compare the amenities detected against the list of predefined object types to determine which amenities are missing. In one example, the computing device may request that the user take a photograph of one or more missing amenities, such as silverware, as shown in FIG. 11, or request that the user take a photo of the inside of an oven, as shown in FIG. 12.

Figure 11:
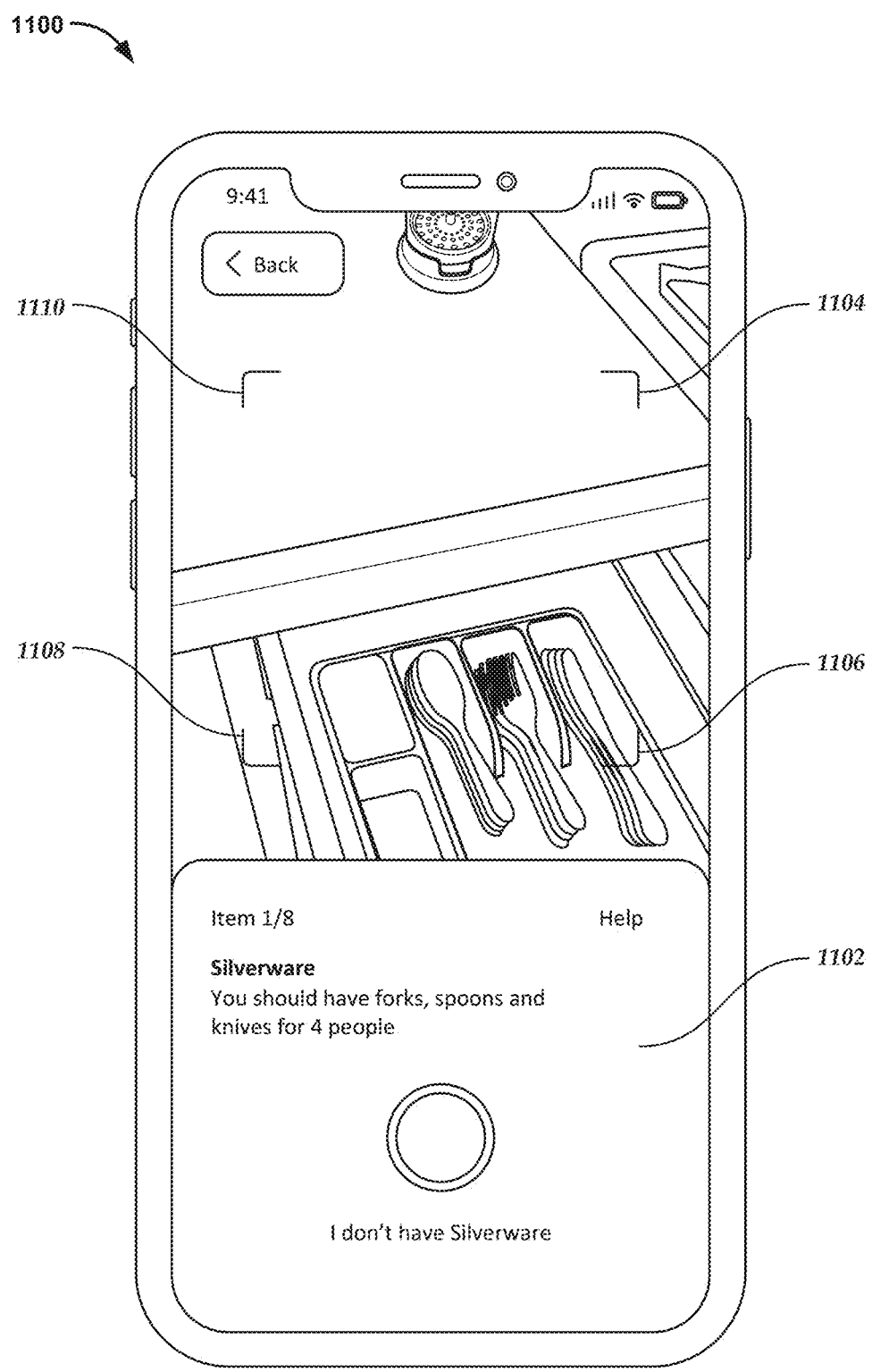
Figure 12:
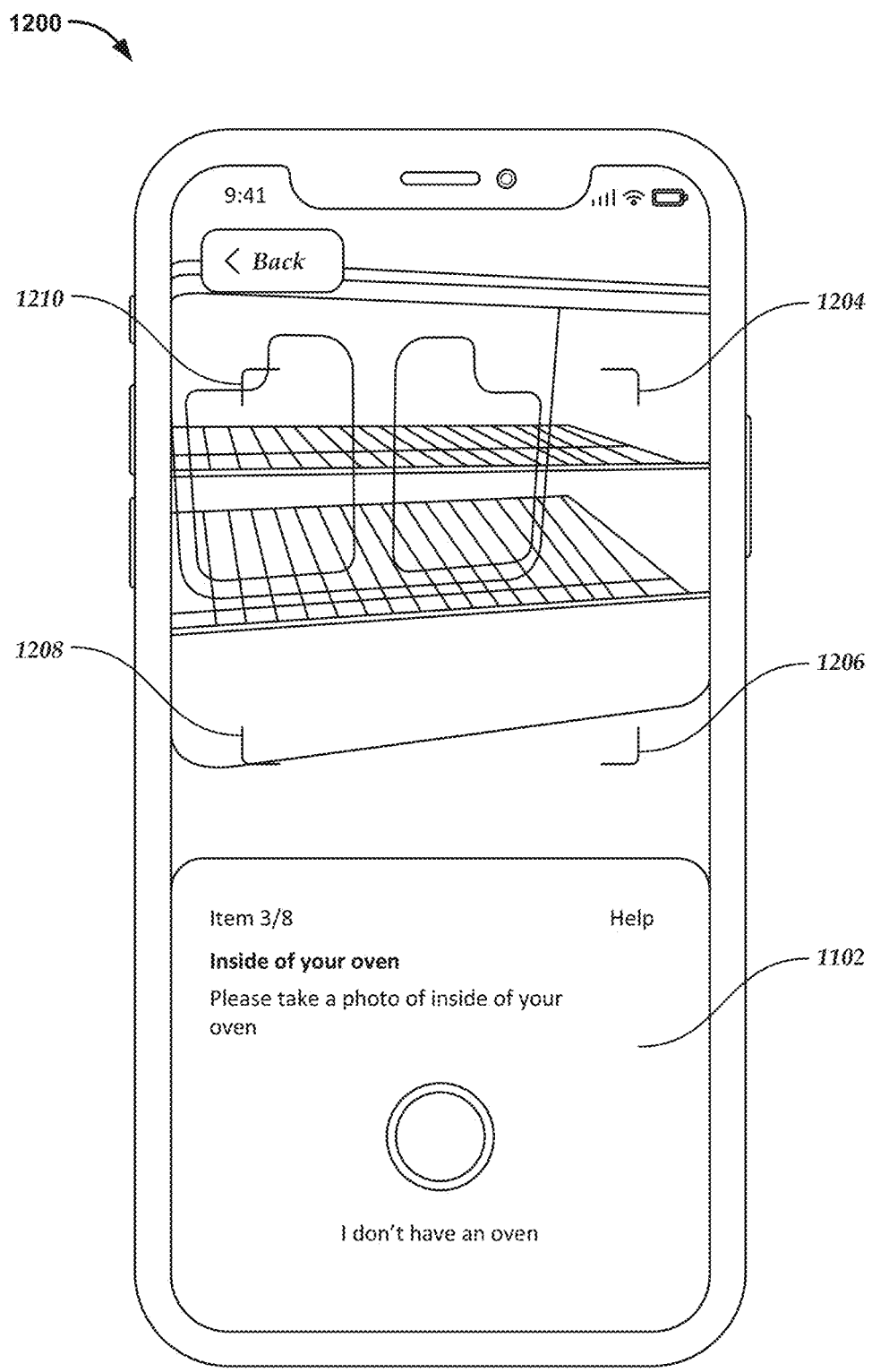

The example GUI 1100 of FIG. 11 comprises instructions 1102 for taking a requested photograph and guidance (e.g., corners 1104, 1106, 1108, and 1110) for how to center the photo to capture the amenity. Likewise, the example GUI 1200 comprises instructions (1202) for taking a requested photograph and guidance (e.g., corners 1204, 1206, 1208, and 1210) for how to center the photo to capture the amenity. In one example, the computing device determines the dimensions for the image captured by the user, as described above for object detection, (e.g., hit testing using one or more points within the image captured by the user (e.g., within a center portion of the image) or within the guidance area (e.g., corners 1104, 1106, 1108, and 1110). The computing device also determines the pose of the computing device. The computing device stores the dimension data comprising the X, Y, Z coordinates and pose of the computing device, with the image.

Figure 13:
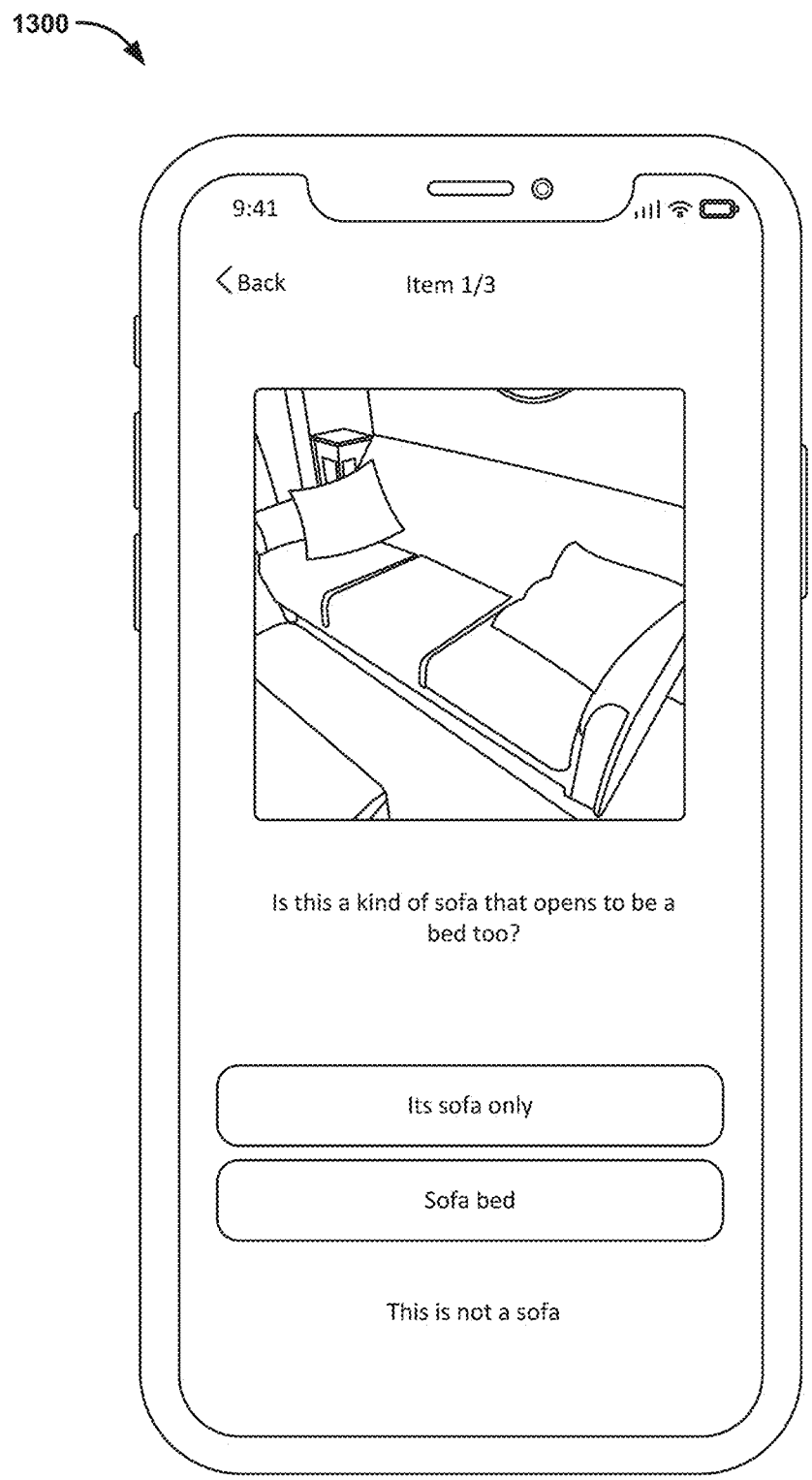

In on example, more information can be requested from the user. For example, the computing device can request, via a GUI as shown in FIG. 13, more information about a detected object. In another example, the computing device can request additional photos or panorama photos be taken of the space to be used for overview photos, listing photos, or for other purposes. The computing device can store these photos (e.g., as image frames) and information from the user, and related information such as the pose of the computing device during capture of each photo or panorama photo.

In one example, the computing device sends the stored image frames (and associated dimensions, etc.), stored detected objects (and associated data (e.g., bounding box, image frames associated with the detected object, dimensions for the detected object), etc.), the 3D reconstruction of the image data (e.g., 3D mesh and textures), and any other data generated by the computing device, to a server system (e.g., server system 102 or image processing system 128) for storage, further image processing, and other functionality. For example, the server system can perform image enhancement on the image frames (e.g., for viewing, posting to a listing, for further/more accurate object detection), generate an interface for an inspector or evaluator to view the image frames or a 3D model of the space, search for objects in the image frames, and so forth. In one example, the computing device sends location information (e.g., latitude/longitude coordinates) of the computing device during the scan of the space (and any additional photographs or information) to the server system. Location information can be used, for example, to verify the images were taken in the location indicated.

In one example, a number of parameters are configurable and changeable. For example, blur thresholds, minimum dimensions size for object types, bounding box threshold size, and so forth as explained above, can be set, updated, and stored on the server system. The computing device can check the parameters stored on the server system to determine the parameters to use during and after the scan and for sending the data to the server system.

Example embodiments are described herein with respect to an online marketplace. It is to be understood that example embodiments can be used in a variety of different use cases, such as interior decorating feedback, home appraisal, insurance evaluation, construction, and so forth. Moreover, scanning of a space can be done by different types of users, such as an inspector, an appraiser, a designer, a general contractor, and so forth.

For ease of description, the methods described herein are performed by a computing device such as a client device 110 (e.g., smartphone). It is to be understood, that other computing devices, such as server system 102 or one or more server computers associated with image processing system 128, can be used to perform the methods described herein. For example, a server system can receive image data from a client device 110, process the received image data as described above (e.g., generate a 3D reconstruction of the image data, etc.), cause a 3D reconstruction of the image data to be displayed on the client device 110, detect one or more objects in the image data, determine dimensions of the one or more detected objects in 3D space, provide data to the client device 110 to cause display of the various GUIs described above, and the like as described above. In another example, the methods described herein can be performed by a combination of a client device 110 and a server system 102 or image processing system 128.

Figure 15:
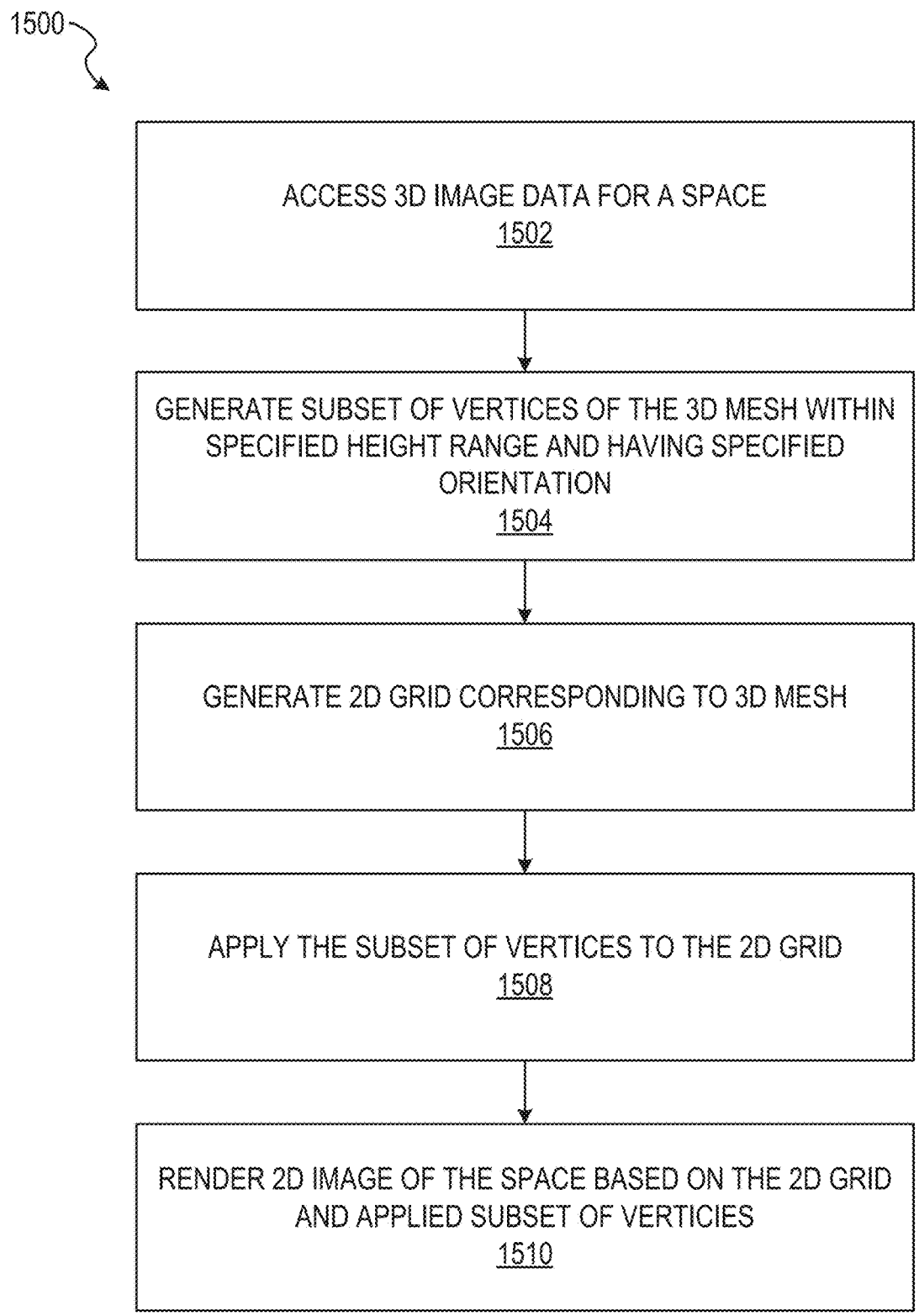
FIG. 15 is a flow chart illustrating aspects of a method, according to some example embodiments.

FIG. 15 is a flow chart illustrating aspects of a method 1500 for generating a 2D floorplan for a space from 3D image data, according to some example embodiments. For illustrative purposes, the method 1500 is described with respect to the networked system 100 of FIG. 1. It is to be understood that the method 1500 may be practiced with other system configurations in other embodiments.

In operation 1502, a computing system (e.g., server system 102 or client device 110) accesses 3D image data for a space. The space may be the inside of an apartment, a house, a building, or other space. In one example embodiment, the 3D image data of the space is generated from image data derived from a scan of the space via a camera of a computing device or other mechanism, as described in the '852 application. In one example embodiment, the 3D image data comprises a 3D mesh of the space. The 3D mesh comprises a plurality of vertices and each vertex of the plurality of vertices has respective 3D coordinates within the space of the 3D mesh. For example, each vertex has a corresponding X, Y, and Z coordinate. In one example, the 3D mesh is a polygon mesh comprising a set of triangles in three dimensions that are connected by their common edges or corners. The vertices are the corners of a triangle. For example, one or more triangles can meet at a single vertex.

In one example embodiment, the 3D image data comprises textures. Textures are used for display of a more photo-realistic looking 3D model, rather than just a wireframe. A texture is a color image mapped to a particular face (e.g., triangle formed by three connected vertices).

In operation 1504, the computing system generates a subset of the plurality of vertices comprising vertices that are within a specified height range and have a specified orientation. For example, to determine which vertices likely correspond to a wall within the space, the computing system discards vertices that are likely not walls, such as vertices that are too low to be a wall (e.g., that may correspond to a floor, chair, couch, and the like). Thus, the lower end of the specified height range may be a height that is slightly higher than a typical chair or couch, in one example. The computing system also discards vertices that likely correspond to objects that are in a higher location, such as upper cabinets in a kitchen, and thus the higher end of the specified height range may be a height that is slightly lower than a typical upper cabinet in a kitchen, for example. In one example, relative bounds of 60-80% are used. In one example embodiment, to convert this to absolute units, the following method can be used:

height_range=Y_max−Y_min

Y: coordinate along the ceiling-floor direction
Y_max: largest Y coordinate value in the mesh
Y_min: smallest Y coordinate value in the mesh Min height=Y_min+0.6*height range Max height=Y_min+0.8*height range It is to be understood that other heights and ranges can be used in example embodiments.

For example, the computing system analyzes each vertex, of the plurality of vertices, to determine if the vertex is within a specified height range based on its 3D coordinates. For example, the computing system compares the Y coordinate of each vertex against the min and max height boundaries calculated using the method described above. If the vertex is not within the specified height range, it is discarded. In this way, all vertices that are not within a specified height range are discarded because they likely do not correspond to a wall in the space.

The computing device may further determine whether a vertex has a specified orientation, such as a vertical or horizontal orientation, based on its 3D coordinates. In one example, the computing device determines a vertex orientation by selecting the vertex of interest, identifying each triangular face in the mesh that the vertex is part of, calculating the normal vector for each of those faces, and averaging those normal vectors to get an approximate vertex orientation. In another example, the computing device uses a library, such as Trimesh, or other method to determine vertex orientation.

For example, the computing device analyzes each vertex of the plurality of vertices to determine if the vertex has a specified orientation (e.g., vertical). If the vertex does not have the specified orientation, the vertex is discarded. For instance, a vertex that is not in a vertical orientation is likely not a wall and thus can be discarded. For example, a vertex corresponding to a counter top or a table top would have a substantially horizontal orientation. In this way, all vertices that do not have the specified orientation are discarded, such as vertices having a horizontal orientation or an orientation that is not substantially vertical.

In operation 1506, the computing system generates a 2D grid corresponding to the 3D mesh. The 2D grid represents the space of the 3D mesh and has the same size and shape as an outer boundary of the 3D mesh. For example, an outer boundary of the 3D mesh is determined based on the maximum X and Y coordinates in each direction in the space of the 3D mesh. In one example, the computing system can perform the following method to determine the boundary of the 3D mesh:

a. grid_increment=0.1
  user configurable, size in meters of each 2D (square) grid cell
b. grid_min_x=min(V['x'])
  minimum X coordinate value over all vertices, V
c. grid_min_z=min(V['z'])
  minimum Z coordinate value over all vertices, V
d. filter vertices according to, e.g., Y height boundaries, orientations (as described above)
e. for each v in V:
  v['x_ind']=integer((v['x']−grid_min_x)/grid increment)
  v['z_ind']=integer((v['z']−grid_min_z)/grid_increment)
  assign each vertex, v, to a cell in the 2D grid byconverting its x/z coordinates to integer indices, x_ind/z_ind
f. for x_ind in 0: max(V['x_ind']):
  for z_ind in 0: max(V['z_ind']):
    aggregate all vertices belonging to x_ind/z_ind
    In on example, aggregation could be simply counting the number of vertices belonging to the cell
    In another example, aggregation could be more complex, such as the mean of all orientation vectors for vertices belonging to the cell
g. filter cells
  e.g. if cell value is below a certain threshold, set it to 0

It is to be understood that other methods can be used to determine the boundary of the 3D mesh. Each square in the 2D grid corresponds to a particular portion of the 3D mesh at that location.

In operation 1508, the computing system applies the subset of vertices to the 2D grid. For example, the computing system generates a dot or other indicium on the 2D grid for each vertex at the location corresponding to the 3D coordinates of the vertex. In this way, each vertex of the subset of the plurality of vertices (e.g., that is likely representative of a wall) is represented as a dot on the 2D grid based on the X and Y coordinates of the respective 3D coordinates.

Figure 16:
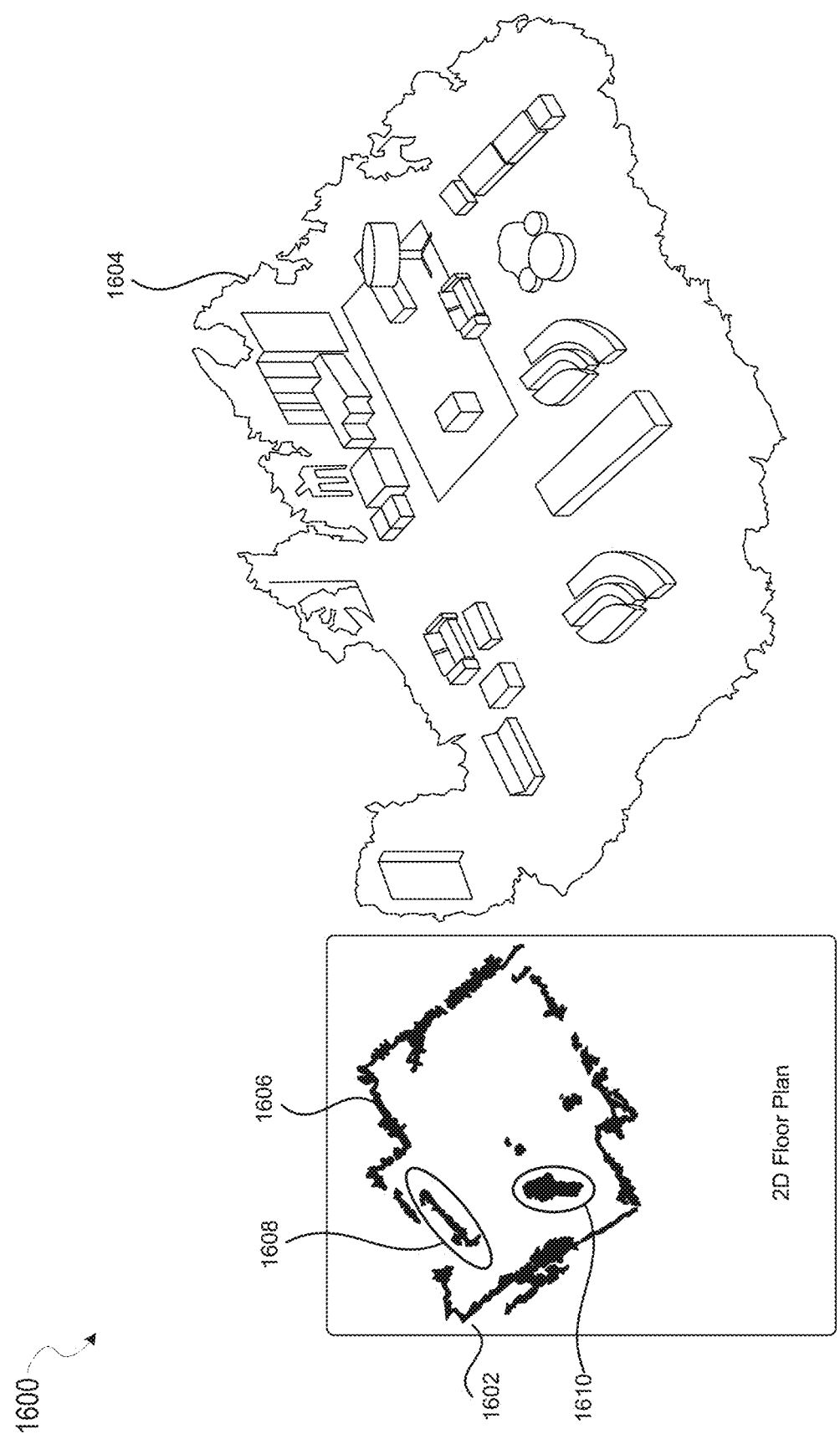
FIGS. 16-21, 22A-22D, and 23-28 illustrate example 2D floorplans and graphical user interfaces (GUIs), according to some example embodiments.
Figure 22A:
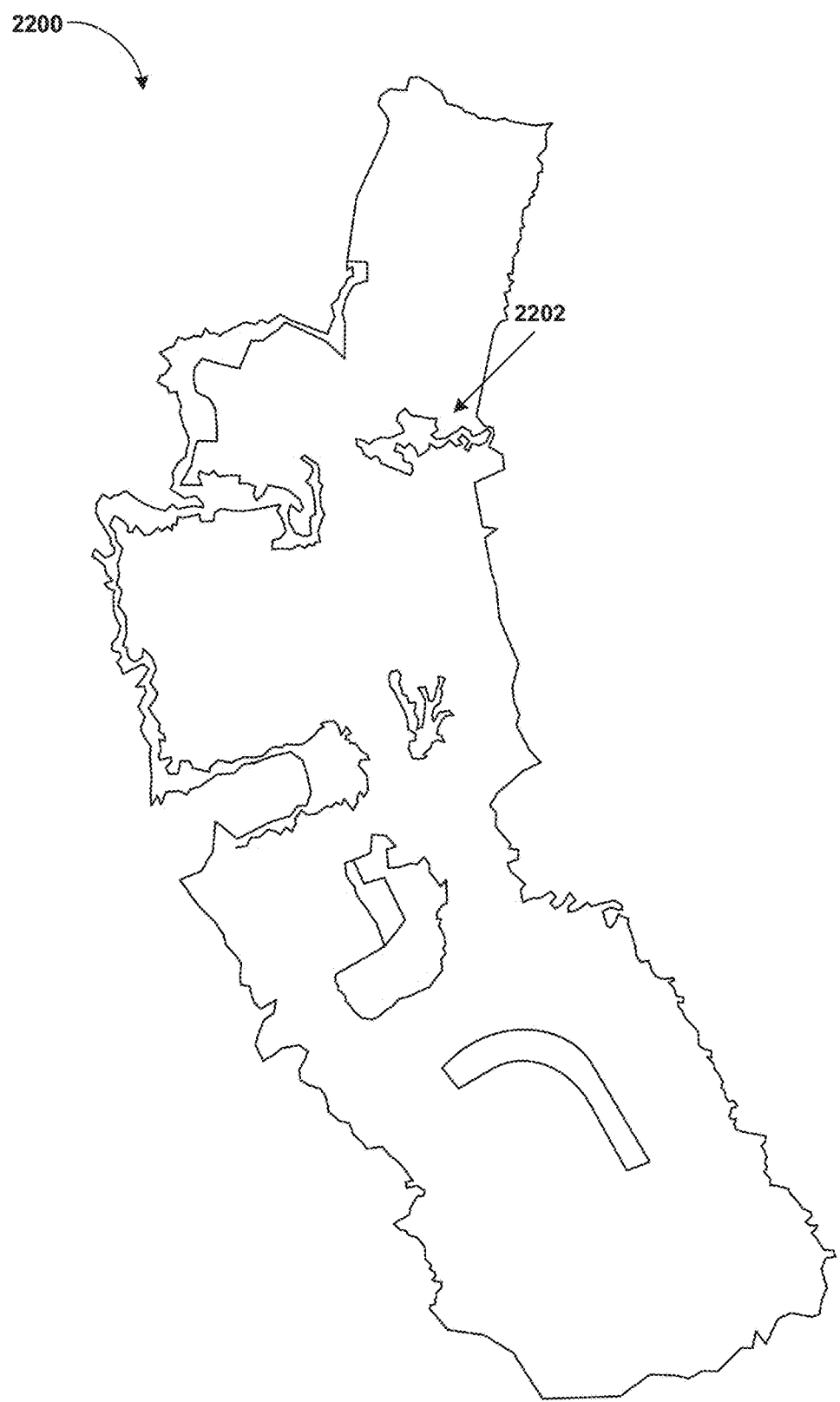

In operation 1510, the computing system renders a 2D image of the space based on the 2D grid and applied subset of vertices. For example, the computing system renders a 2D image of the space comprising an outer border corresponding to the size and shape of the 2D grid and indications of walls within the space based on the applied subset of the plurality of vertices. FIG. 16 illustrates an example 1600 showing a rendered 2D image 1602 based on a 3D representation 1604 of the space. In this example, the indications of the walls are represented by a clustering of dots corresponding to each vertex of the subset of the plurality of vertexes. In this example, there are no actual interior walls since the space is just one open room. Thus, the indications primarily show an exterior wall 1606 (e.g., the boundary for the space). One interior indication 1608 is shown, which is actually a staircase, and another interior indication 1610 is shown that is actually a highbacked sofa, as can be seen by the 3D representation 1604 of the space. FIG. 22A illustrates another example showing a rendered 2D image 1100 based on a 3D representation of a space that also includes interior walls, such as the interior wall 2202.

In one example, the computing system causes display of the rendered 2D image on a computing device. In one example embodiment, the computing system is a backend system, such as server system 102, and thus, the computing system provides the rendered 2D image to a computing device (e.g., client device 110) and the computing device displays the rendered 2D image in on a graphical user interface (GUI) of a display of the computing device. In another example embodiment, the computing system is a computing device (e.g., client device 110) and the computing device displays the rendered 2D image in on the GUI of a display of the computing device.

Figure 17:
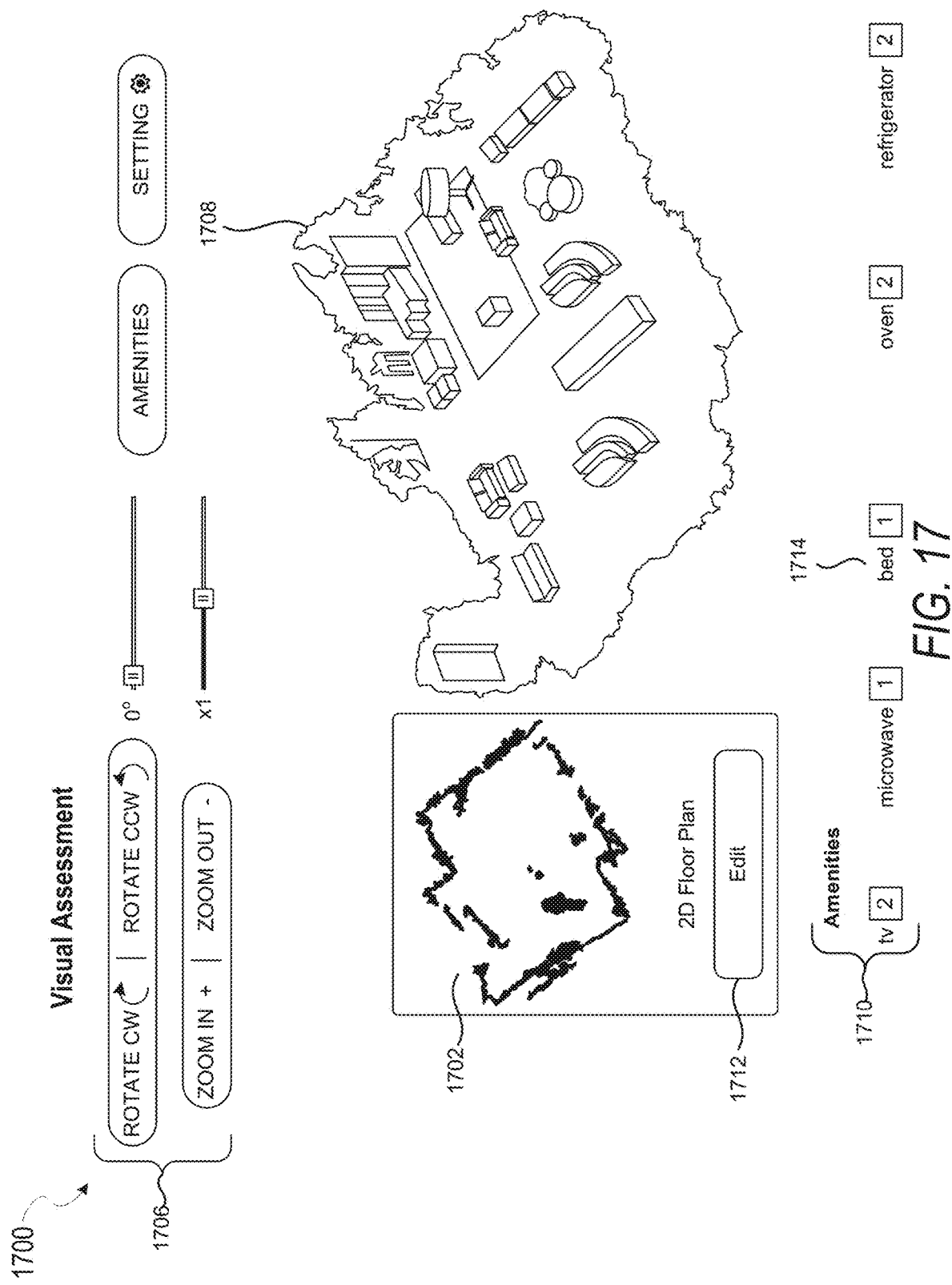

FIG. 17 illustrates an example GUI 1700 displaying a rendered 2D image 1702. The GUI 1700 also displays the 3D image 1708 from which the 2D image was rendered, controls 1706 for rotating the 2D image and 3D image and zooming in on the 2D image and 3D image, and a list of amenities 1710 that were detected in the space. In one example, rotating the 2D image results in the 3D image rotating in the same way and rotating the 3D image results in the 2D image rotating in the same way.

In one example, a user can select an amenity in the list of amenities 1710 to view images of the amenity derived from the 3D image data. For example, if the user selected the amenity 1714 for a bed that was detected in the space, the computing system would cause images of the bed to be displayed in the GUI 1700.

Figure 18:
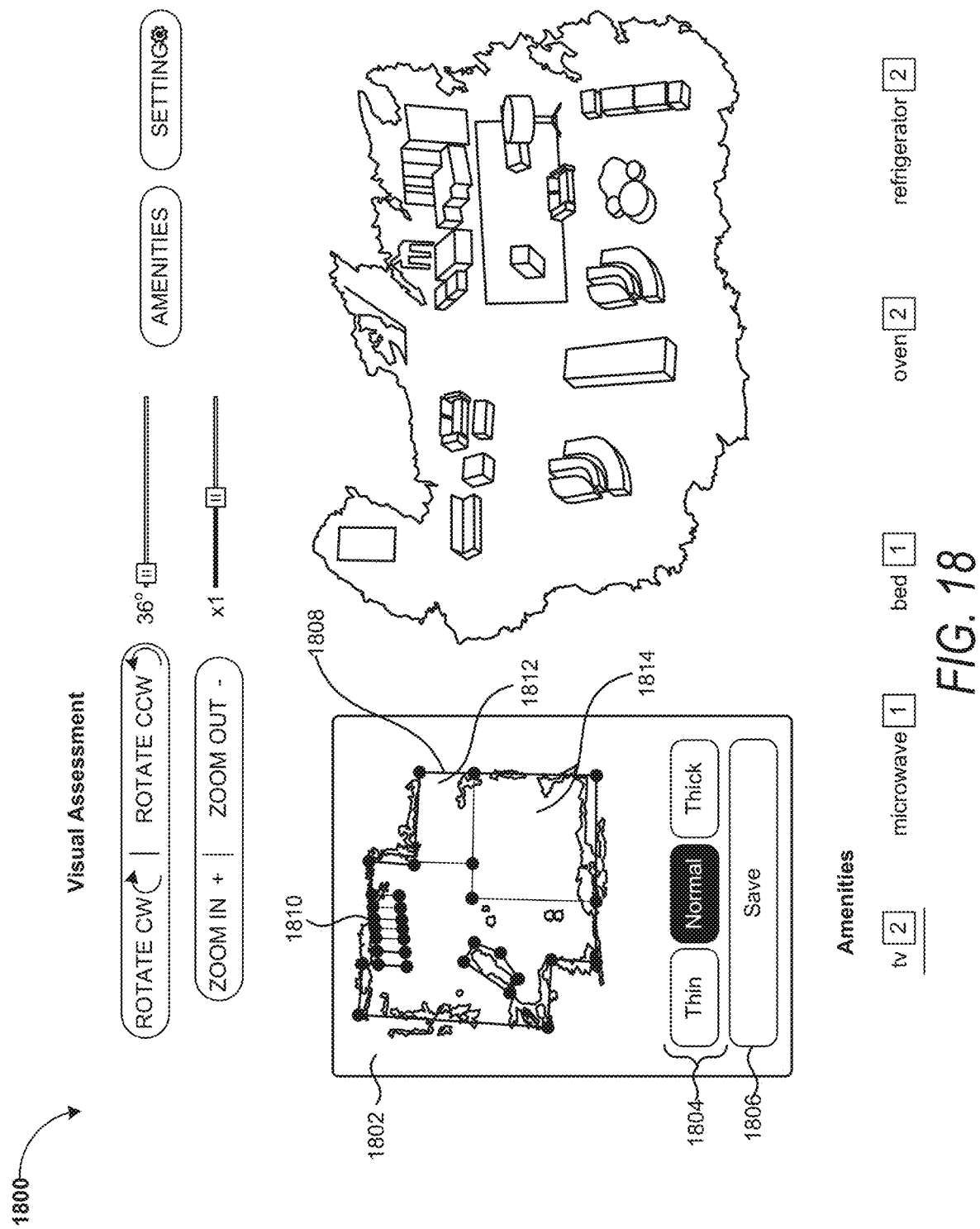
Figure 19:
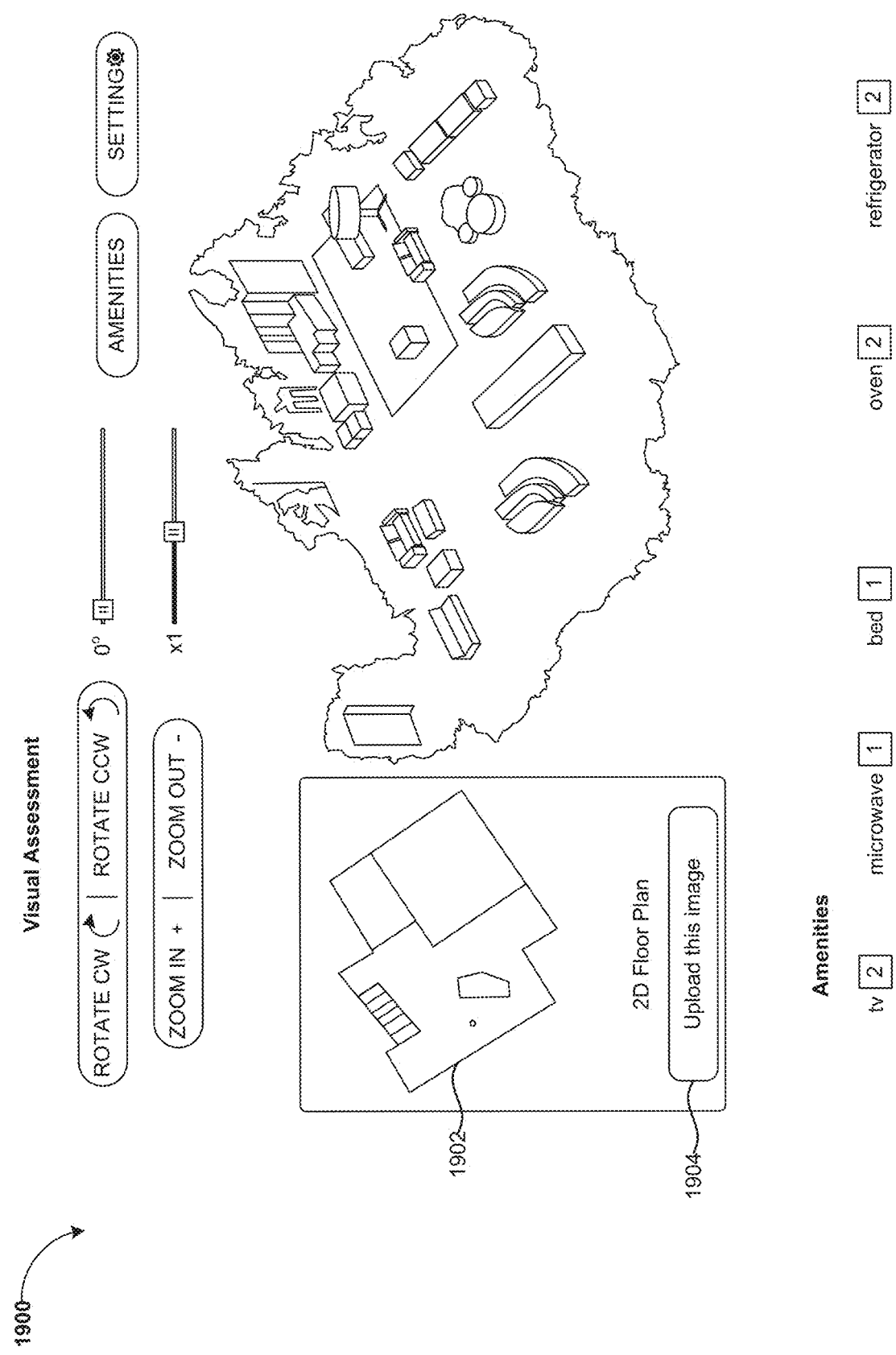

The GUI 1700 also provides an option 1712 to edit the rendered 2D image 1702. This allows a user to draw lines to designate discreet spaces (e.g., rooms) in the 2D image. FIG. 18 illustrates an example GUI 1800 illustrating when the user elects to edit a 2D image 1802. In this example, the user can select a line thickness from options 1804 to draw lines on the 2D image 1802, the lines representing walls or designated spaces within the space. For example, the user has drawn lines to indicate the outer border 1808 (e.g., exterior walls) for the space, lines to designate the stairs 1810, and lines to designate a kitchen area 1812 and a dining area 1814. The GUI 1800 also provides an option 1806 for the user to save the edits made. Once the user saves the edits, the computing system generates a 2D floor plan based on the edits. The 2D floor plan can displayed based on the user edits, as shown as the floor plan 1902 in the GUI 1900 of FIG. 19. The GUI 1900 of FIG. 19 also provides an option 1904 for the user to upload the image of the 2D floorplan. In one example, the user can upload the image of the 2D floor plan to a listing for the place in an online market place.

Figure 22B:
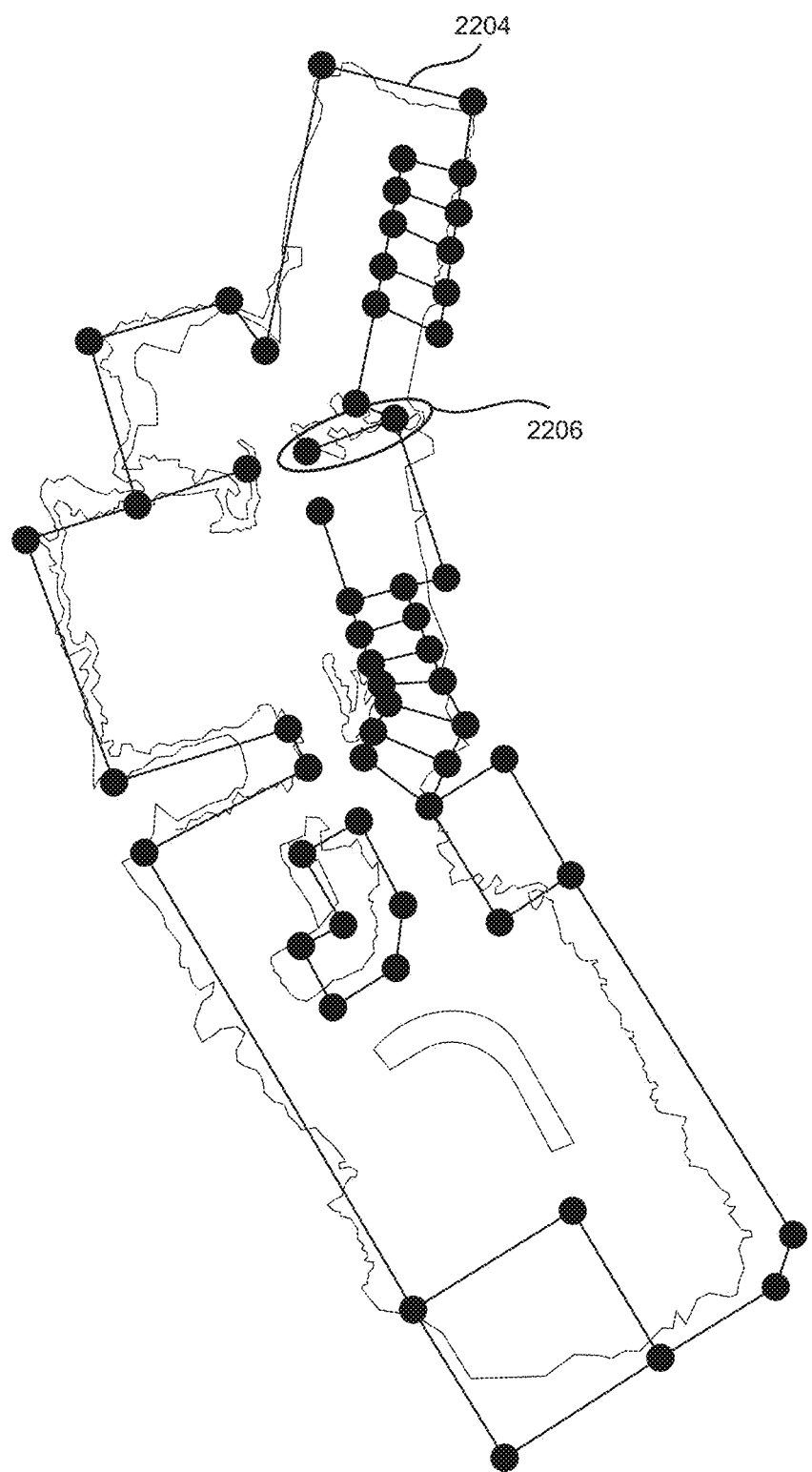
Figure 22C:
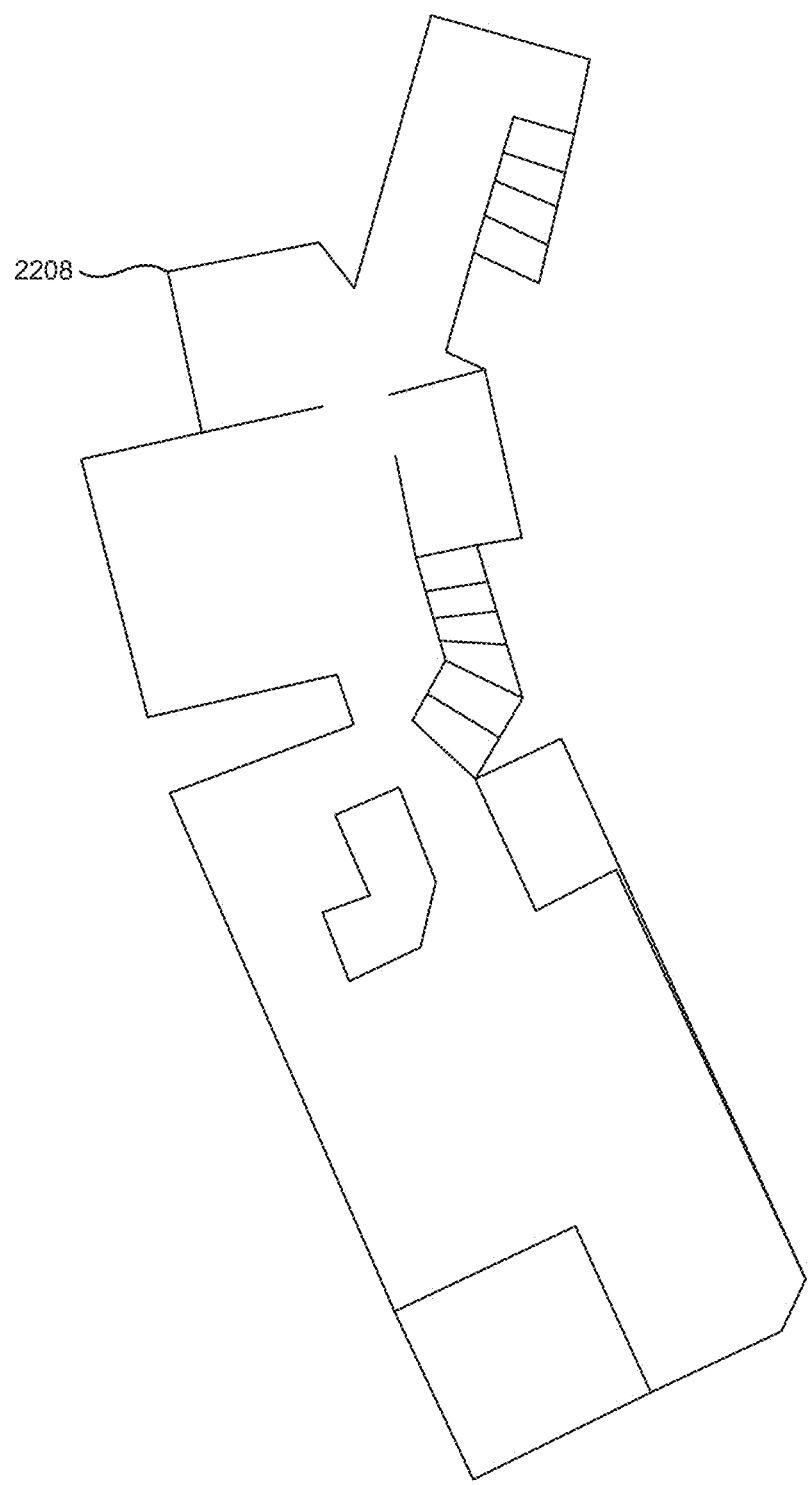
Figure 22D:
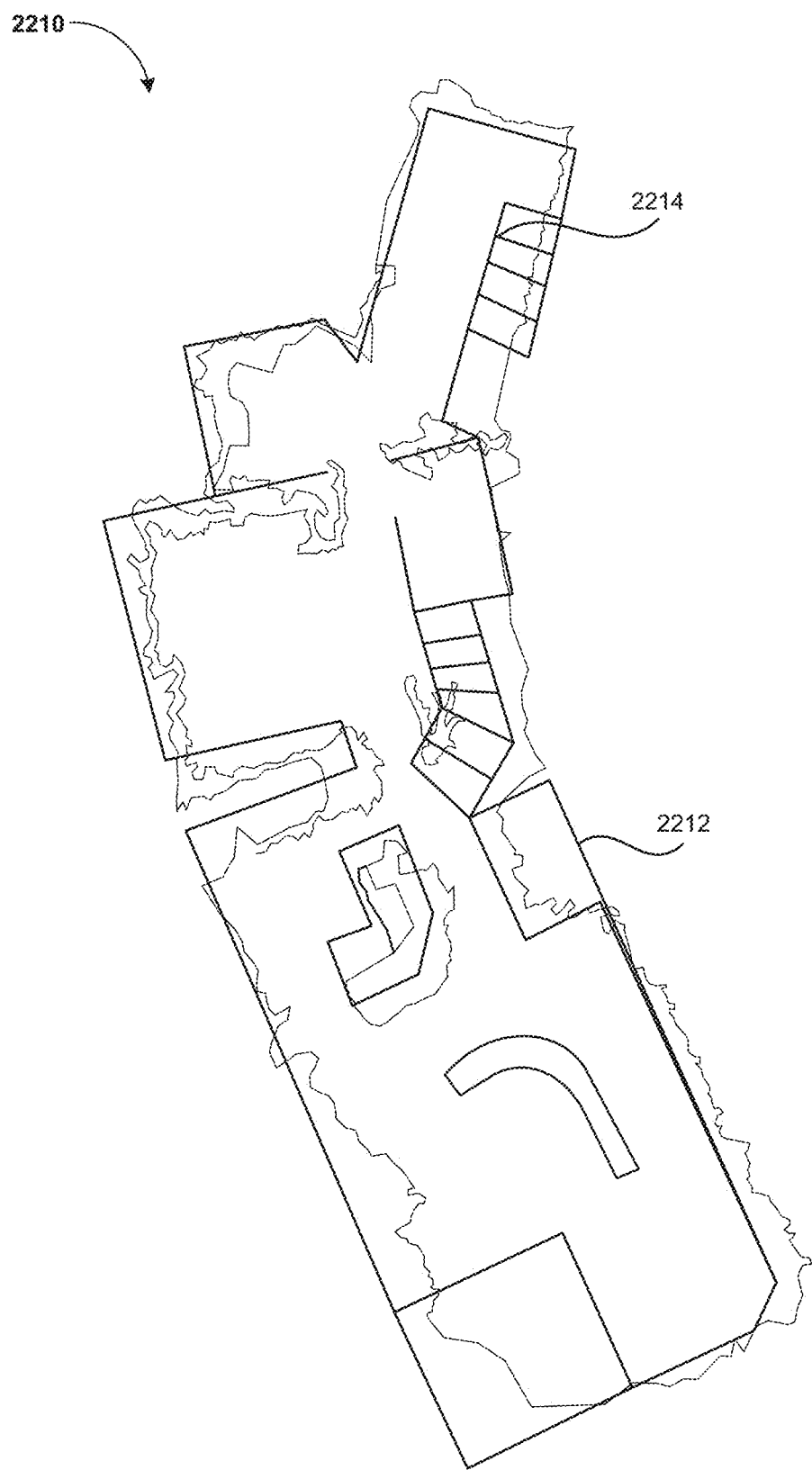

FIG. 22B illustrates another example illustrating when a user has elected to edit the 2D image shown in FIG. 22A. In this example, the user has drawn lines to indicate the outer border 2204 (e.g., exterior walls) and lines to designate interior walls (e.g., interior wall 2206) and so forth. FIG. 22C shows another example of a 2D floor plan 2208 that was generated from the edits made in FIG. 22B. FIG. 22D illustrates an example 2210 of how the 2D floor plan 2212 maps to the 3D image 2214.

Figure 20:
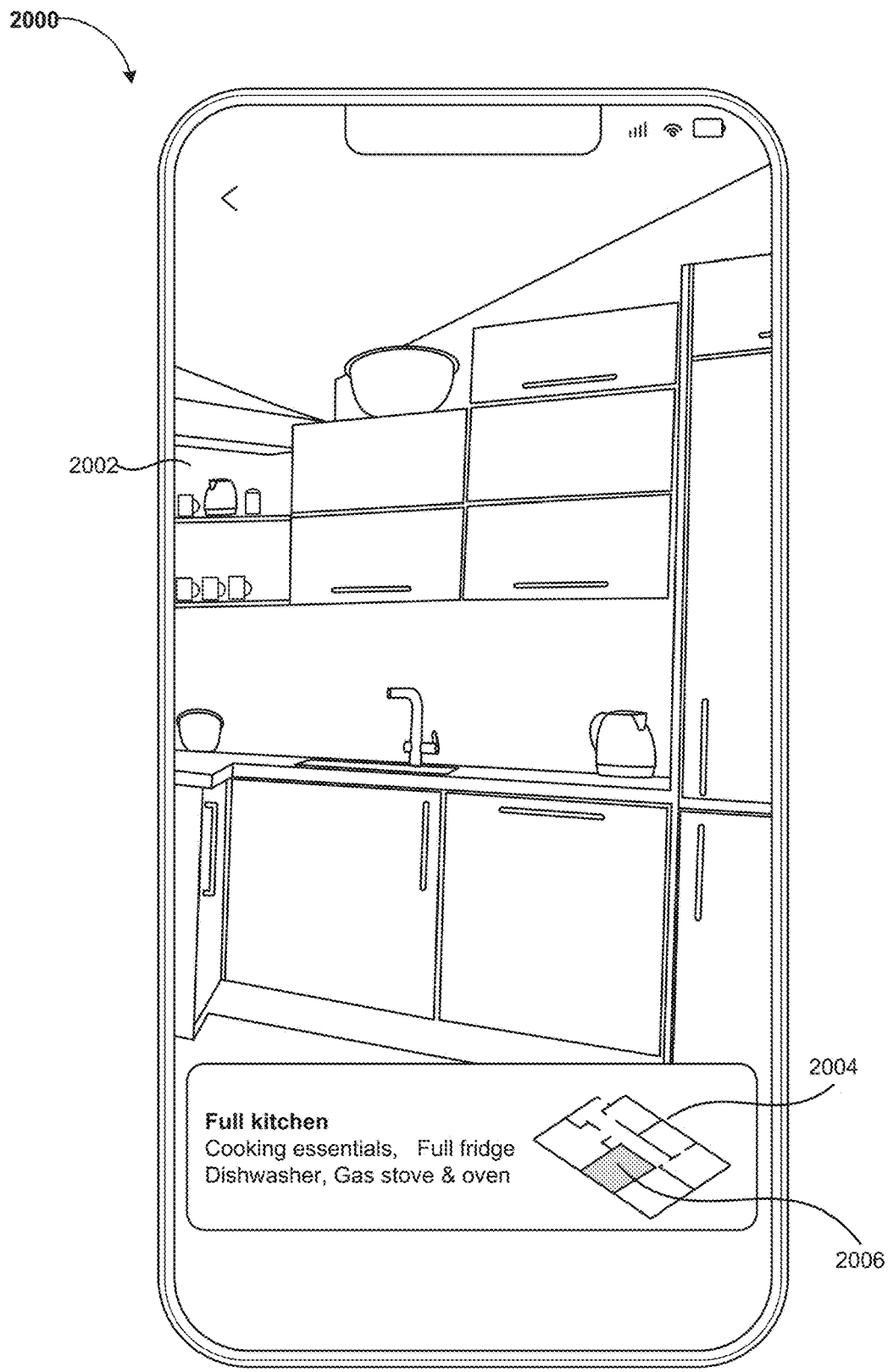

In one example, the user can upload the image of the 2D floor plan to a listing for the space in an online market place. FIG. 20 illustrates an example GUI 2000 of a listing for a space (e.g., an apartment or home) that can be booked by a user (e.g., guest). The GUI 2000 shows an image 2002 of a kitchen in the space and a 2D floor plan 2004 with the room highlighted to indicate where the kitchen 2006 is located in the space.

Figure 21:
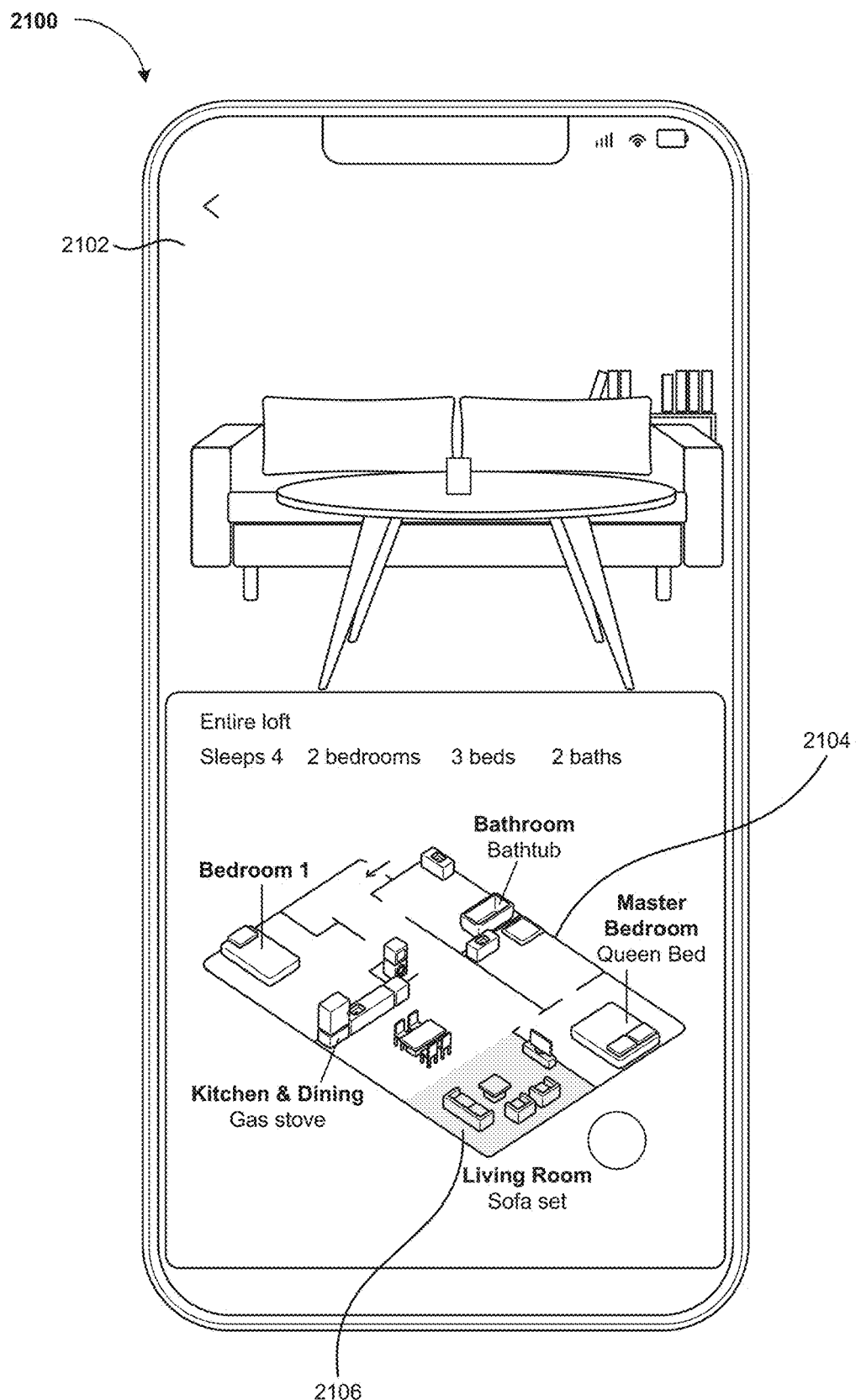

FIG. 21 illustrates another example GUI 2100 of a listing for a space that can be booked by a user. The GUI 2100 shows an image 2102 of a living room and a 2D floor plan 2104 with the room highlighted to indicate where the living room 2106 is located in the space.

As the user scrolls through images of the space, the room associated with the image is highlighted in 2D floor plan 2004 or 2104. For example, the computing system identifies objects (e.g., amenities, such as a refrigerator, stove, sofa coffee table) that are located in each room and determines a room type for each room in the 2D floor plan (e.g., based on the objects identified in the room), as described in further detail below. Moreover, the computing system can determine images corresponding to the objects located in each room, based on the 3D image data. Accordingly, the computing system can determine which room to which each image in the listing corresponds and highlight the room in the 2D floor plan on the GUI 2000 that corresponding to the image 2002 that is being displayed.

In one example embodiment, the computing system can automatically render the lines indicating the walls based on a confidence level that a cluster of vertices comprises a wall.

In this example, the computing device can render the 2D image of the space with lines indicating the outer or exterior walls and lines indicating the interior walls based on clustering of dots corresponding to each vertex of the subset of the plurality of vertices.

In one example, the computing system automatically renders the lines indicating the walls using a machine learning model trained to predict a correct floor plan from a raw floor plan. For instance, give a dataset of raw 2D floorplans (e.g., generated as described above) and corresponding correct 2D floor plan (e.g., via human annotation), the machine learning model can be trained to predict a correct floor plan from a raw floor plan.

In another example, the computing system can automatically render the lines indicating the walls using a machine learning model trained to directly predict which vertices belong to walls. Then the above-described method for generating a 2D floorplan can be used, excluding all non-wall vertices, to render the lines indicating the walls.

For example, the 2D floor plan 2208 of FIG. 22C can be automatically generated from 3D image data corresponding to the 3D image 2214 shown in FIG. 22D of the space. In one example, a user can use the tools described above and with respect to FIG. 18 and FIG. 22B to select and edit the lines in the 2D floorplan by moving or resizing the lines, changing the thickness of the lines, and so forth. The user can also upload the final 2D floor plan, as also described above.

In one example embodiment, the computing system determines that a portion of the 2D image indicates a room. For example, the computing system determines that a portion of the 2D image represents a room based on lines drawn by a user indicating a room or based on automatically drawn lines that indicate a room (e.g., three or more lines that form a space in between). In one example embodiments, the computing system can determine portions of the 2D image that represents a room by constraining potential room boundaries using a known walking path of a person who acquired (e.g., captured) the raw image data, the positions of detected furniture, amenities, or the like, or other method.

In one example embodiment, the computing device determines a room type for the portion of the 2D image based on objects (e.g., amenities) detected in 3D image data corresponding to the space. Amenities can include a refrigerator, a stove, a microwave, an oven, a dining table, a sofa, a chair, a coffee table, an ottoman, a television, a bed, a nightstand, a dresser, a wardrobe, a toilet, a bathtub, a shower, a closet, utensils, a toaster, and so forth. In one example the objects are detected in the 3D image data using machine learning models trained to detect objects in an image, such as ssd_mobilenet_v2 and the like, and as described above. The detected objects and related data (e.g., 3D coordinates or dimensions, images of the detected objects) are stored in one or more datastores (e.g., database 126).

The computing system accesses the one or more datastores to analyze location data for the detected objects and determine which detected objects are located in the portion of the 2D image for the room. For example, the computing system determines whether the detected objects have 3D coordinates that fall substantially within the 3D coordinates of the portion of the 2D image for the room. Based on the detected objects that are located in the portion of the 2D image for the room, the computing system determines the room type.

In one example embodiment, the computing system can determine the room type based on determining that the detected objects include a specified number of detected objects in a predefined list of amenities (objects) associated with the room type. For example, if the detected objects include a refrigerator or a stove, the computing system can determine that the room type is a kitchen. In another example, if the detected objects include a bed and a dresser, the computing system can determine that the room type is a bedroom. In yet another example, if the detected objects include a toilet, the computing system can determine the room type is a bathroom. The computing system can determine if a room type is a living or family room based on the detected objects including a sofa and a television.

In another example, the computing system can determine a room type by using a machine learning model to classify a type of room to which each image belongs (e.g., kitchen, bathroom) and then mapping the classification to a 2D grid cell where the image was taken from.

In another example embodiment, an amenity list can be classified by room type. For example, using boundary information defined by the 2D floor plan (either automatically or via a floor plan editor), a room type can be determined, as described above, and then the room type can be associated with one or more amenities. For instance, an oven can be associated with a kitchen room type, a toilet with a bathroom room type, and so forth.

In yet another example embodiment, a space an be classified based on one or more determined room types (e.g., how many bedrooms, how many bathrooms, no bedroom, etc.). For instance, a space can be classified as a one bedroom, one bathroom space based on determining a bedroom and a bathroom. The classification for the space can be used to display to a user, display in a listing of the space, and so forth.

In one example embodiment, the computing system can render images of one or more objects that are located in the portion of the 2D image. In one example, the computing system renders an image of an object based on the actual image data for the object such that the image of the object can be displayed as the actual 2D image of the object. For example, the computing system uses the actual image frame (e.g., photograph) of the object to display in the 2D image (floorplan).

Figure 23:
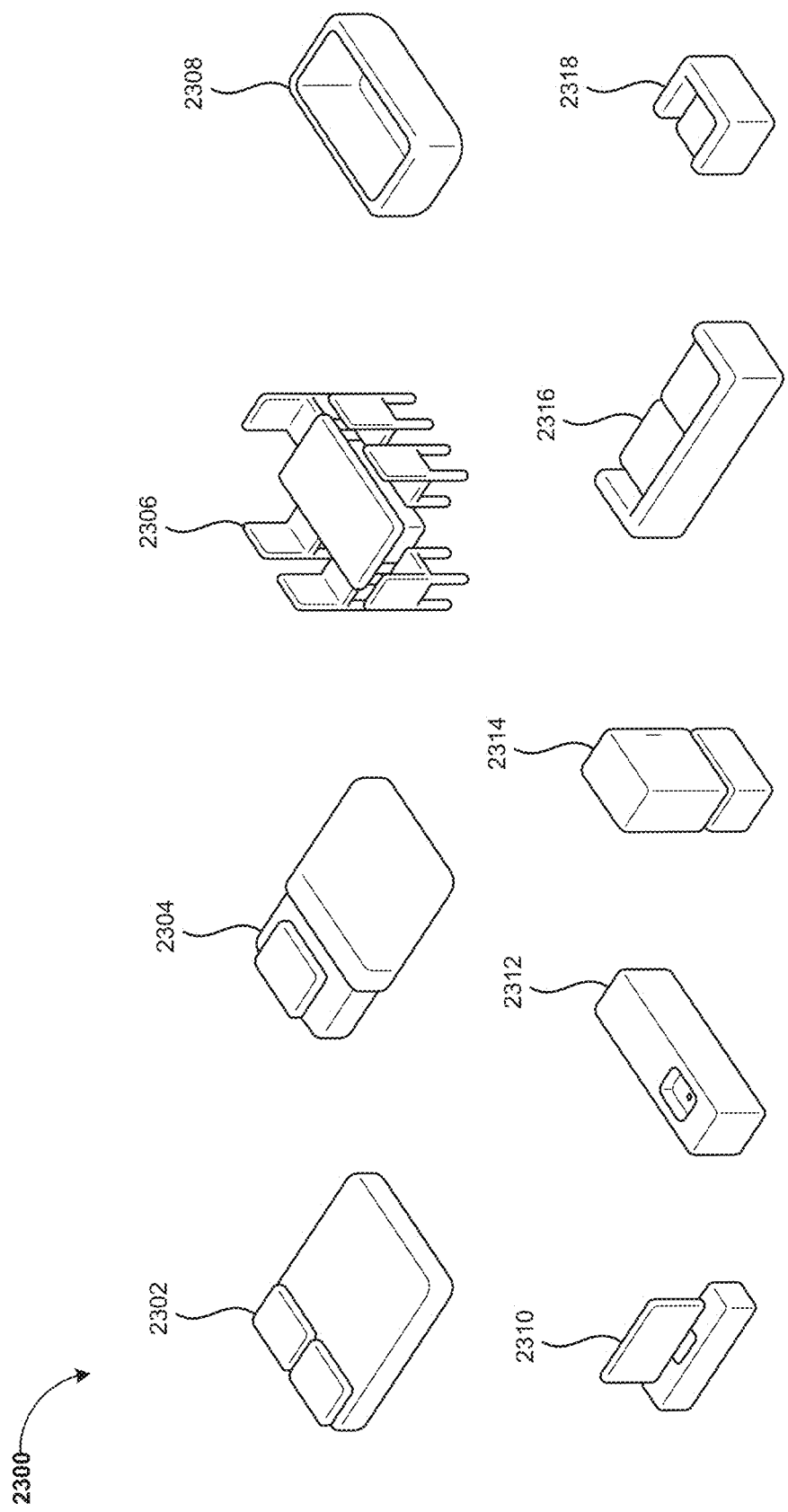

In another example, the computing system selects an image corresponding to the object from a list of predefined images. For example, FIG. 23 illustrates some example predefined images 2302-2318. This example includes a predefined image for a double bed 2302, a predefined image for a single bed 2304, a predefined image for a dining table and chairs 2306, a predefined image for a bathtub 2308, a predefined image for a television 2310, a predefined image for a vanity and sink 2312, a predefined image for a washer and dryer 2314, a predefined image for a sofa 2316, and a predefined image for a chair 2318.

The computing system can place each rendered image in a location on the 2D image associated with the coordinates corresponding to the respective object. For example, the computing system can access the 3D coordinates of the object from the one or more datastores and determine the location in the 2D image that corresponds to the 3D coordinates of the 3D image data (from which the 2D image is generated).

In one example, the computing system can use machine learning to detect and localize objects within the 2D images that comprise the raw scan data. The localization consists of a box drawn tightly around the object. Then, using the knowledge of the position and orientation of the camera at the time of image acquisition (e.g., from the 3D image data), the computing system can cast a virtual ray from the capture device position to the center of the object box. The point at which the ray intersects the 3D mesh defines the approximate point in 3D space where the object resides. The same approach from 2D floor plan generate can be used to map the 3D point to a cell in the 2D grid.

The computing system can cause display of the rendered 2D image comprising the rendered images of the one or more objects, on a display of a computing device.

Figure 24:
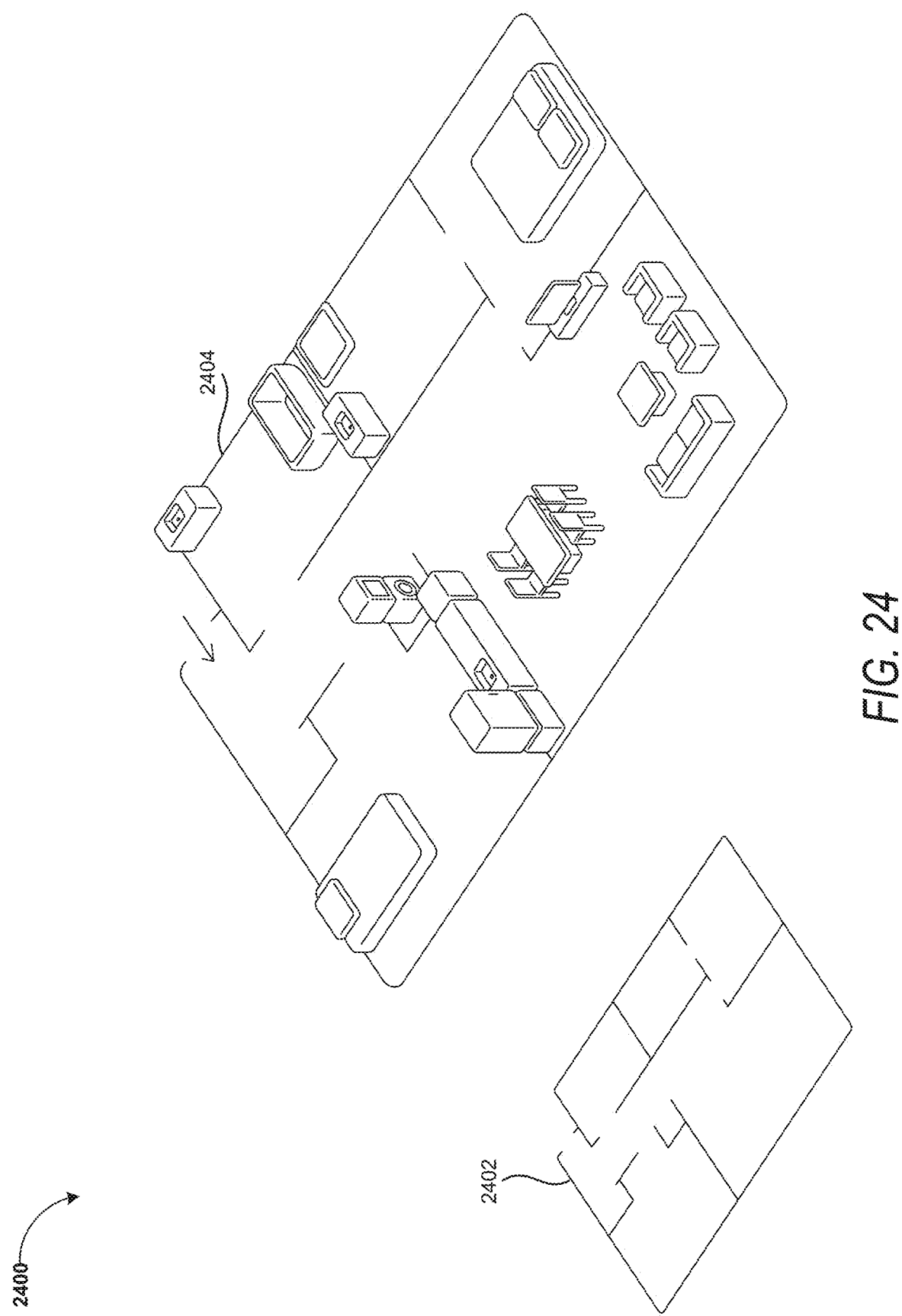

FIG. 24 illustrates an example 2400 including a 2D image 2402 (floorplan) without any objects, and then the 2D floorplan 2404 including the detected objects in the actual location where the object (amenities) are located in the space.

In one example, the objects can be moved, resized, deleted, or otherwise edited. For example, a user can interact with an object by selecting the object (e.g., via a touchscreen or device such as a mouse) to move it to a different location in the floor plan, delete the object, or resize the object. The computing device can detect the movement, indication of deletion, or indication to resize, and cause the object to be displayed in the new location based on the movement, remove the object based on the deletion, or resize the object based on the input for resizing the object. In one example, the user can also add additional amenities to the 2D floor plan (for example, by selecting from a list the available objects).

In one example embodiment, the computing system can identify issues in the space based on the types of object, the location of objects, the room type, and so forth. For example, the computing system can detect that there is a washer and dryer located in the bedroom or that guests staying in a first bedroom would have to walk through a second bedroom to access the only bathroom in the space. Such issue identification can help flag potential issues to a user who is thinking of booking the space or to a user who is reviewing the space to determine if it qualifies for a special status of listing (e.g., an elevated or luxury status). To detect such issues, predefined rules for issue detection can be developed and stored in one or more datastores. For example, one rule can be if an object type is a washer or dryer and the room type is a bedroom, a notification is generated that there is a washer and dryer in a bedroom. The computing system accesses the predefined rules and analyzes the objects in the space, the room types, and so forth, to determine whether any of the rules are triggered. For any rule that is triggered, the computing system can flag the issue, generate a notification corresponding to the issue, cause the notification to be displayed on a computing device, or the like.

Figure 25:
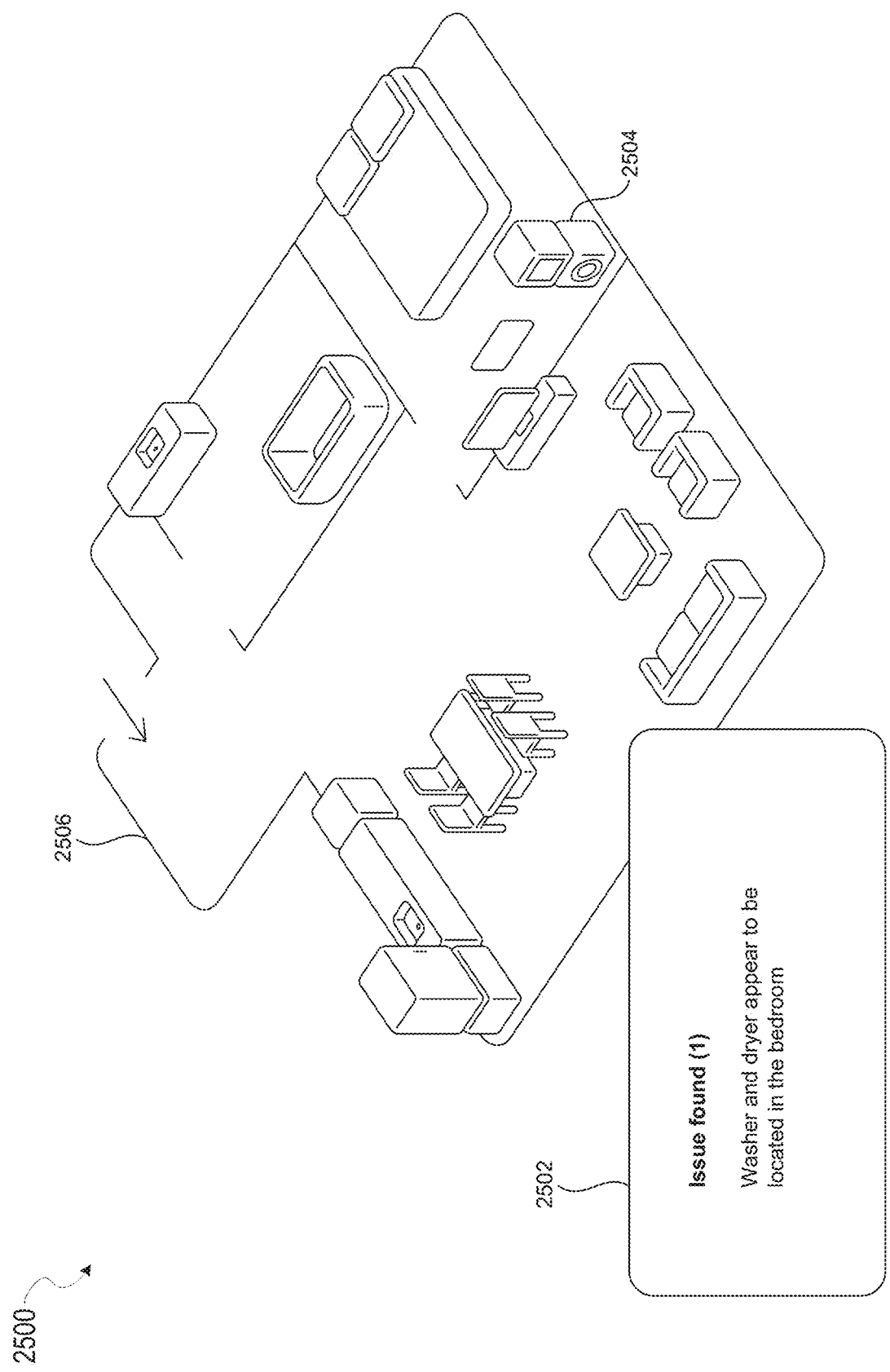
Figure 26:
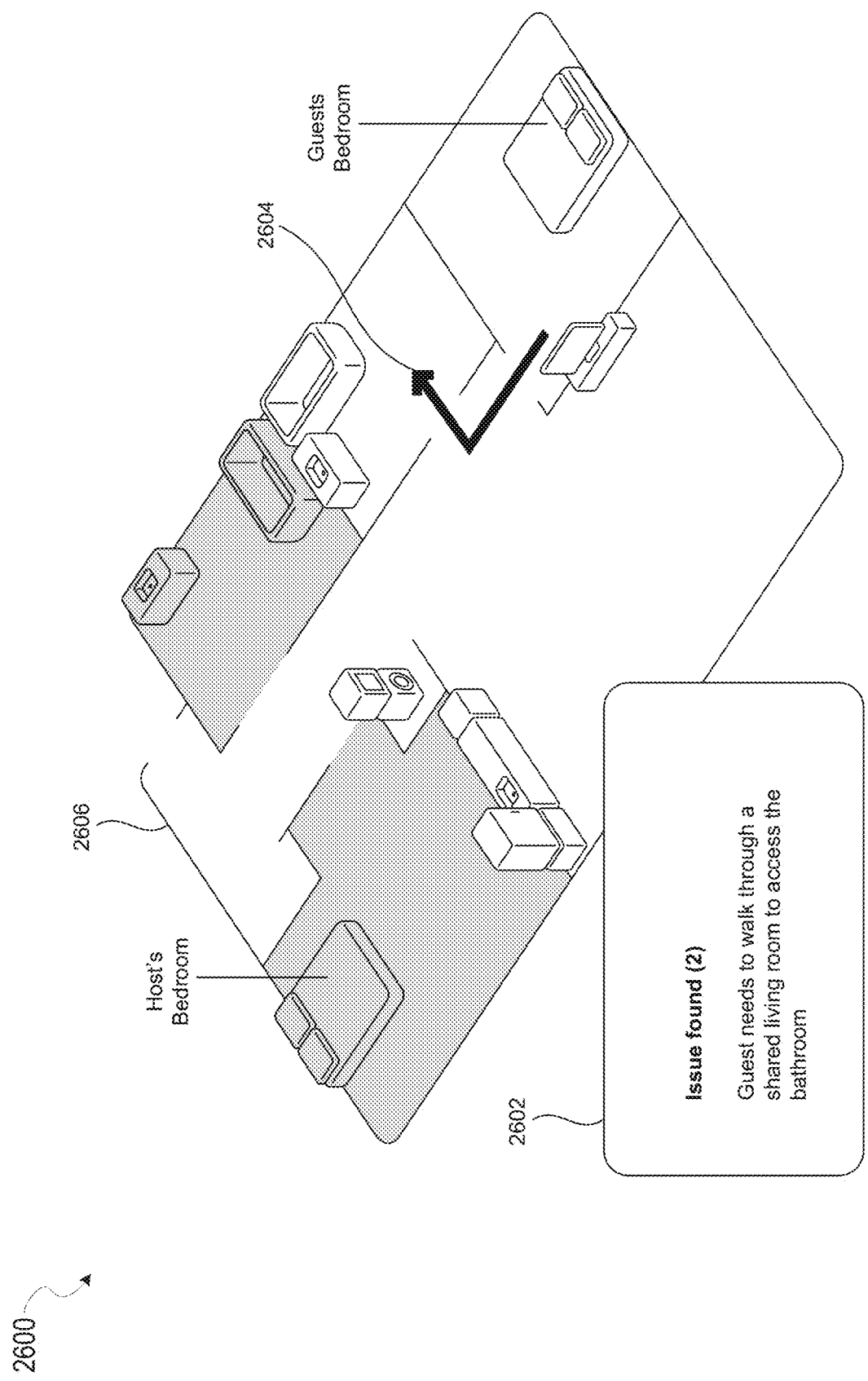

FIG. 25 illustrates an example 2500 of a notification 2502 indicating that a washer and dryer 2504 appear to be located in a bedroom in a 2D floorplan 2506. FIG. 26 illustrates an example 2600 of a notification 2602 indicating that a guest needs to walk through a shared living room to access the bathroom in a 2D floorplan 2606, as shown by arrow 2604.

Figure 27:
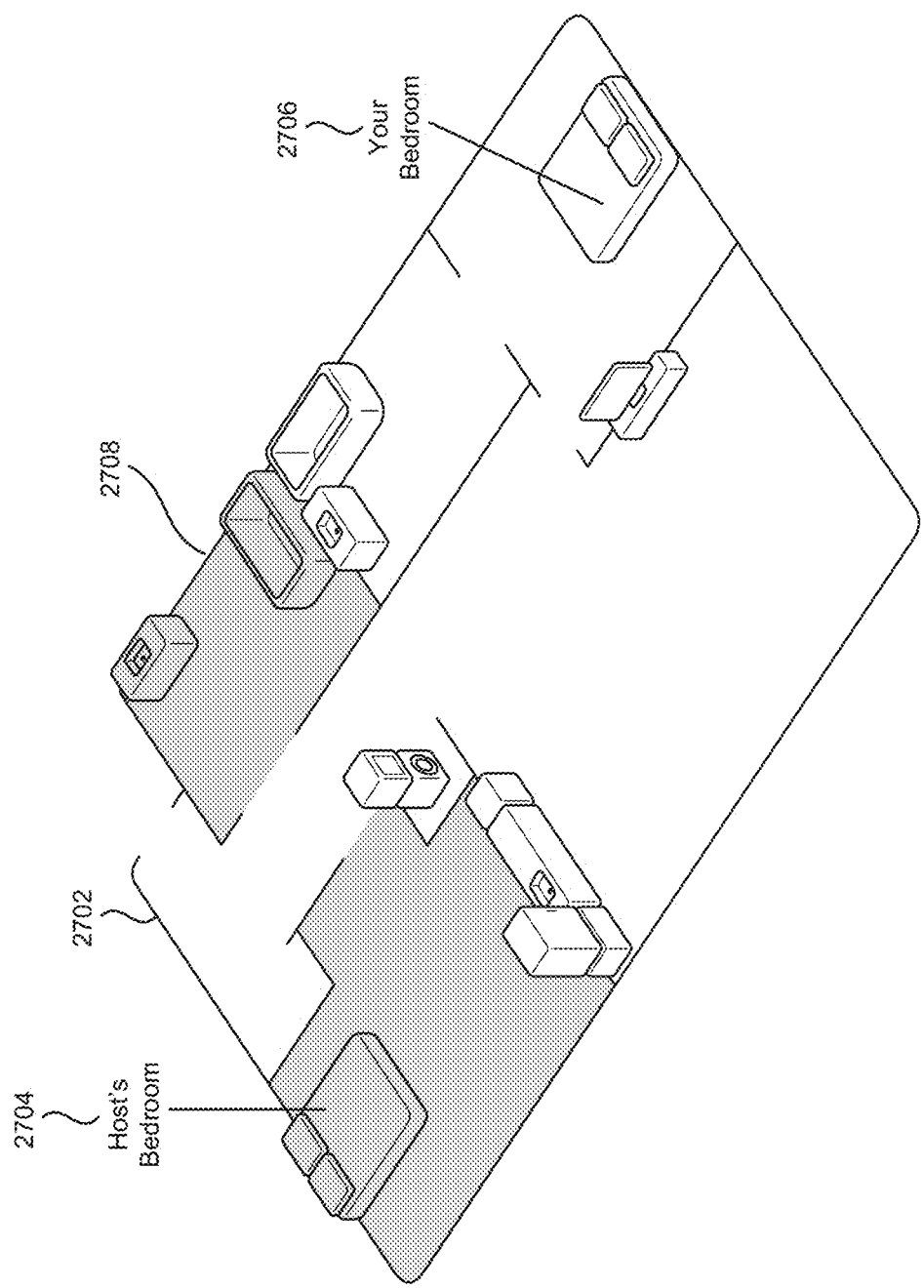

In one example, a user (e.g., guest) may wish to book a private room in a space (e.g., apartment, house). In this example, a 2D floor plan can be used to help the user understand the position of a private room related to the host's room. The 2D floorplan can also be used to allow a host to communicate which areas of the space a guest can use (e.g., which bathroom, whether or not a guest can use the kitchen). FIG. 27 illustrates an example 2D floorplan 2702 that has the host's bedroom 2704 and guest's bedroom 2706 labeled. The 2D floor plan also indicates that the host's bedroom 2704 and one of the bathrooms 2708 are not accessible for guests.

Figure 28:
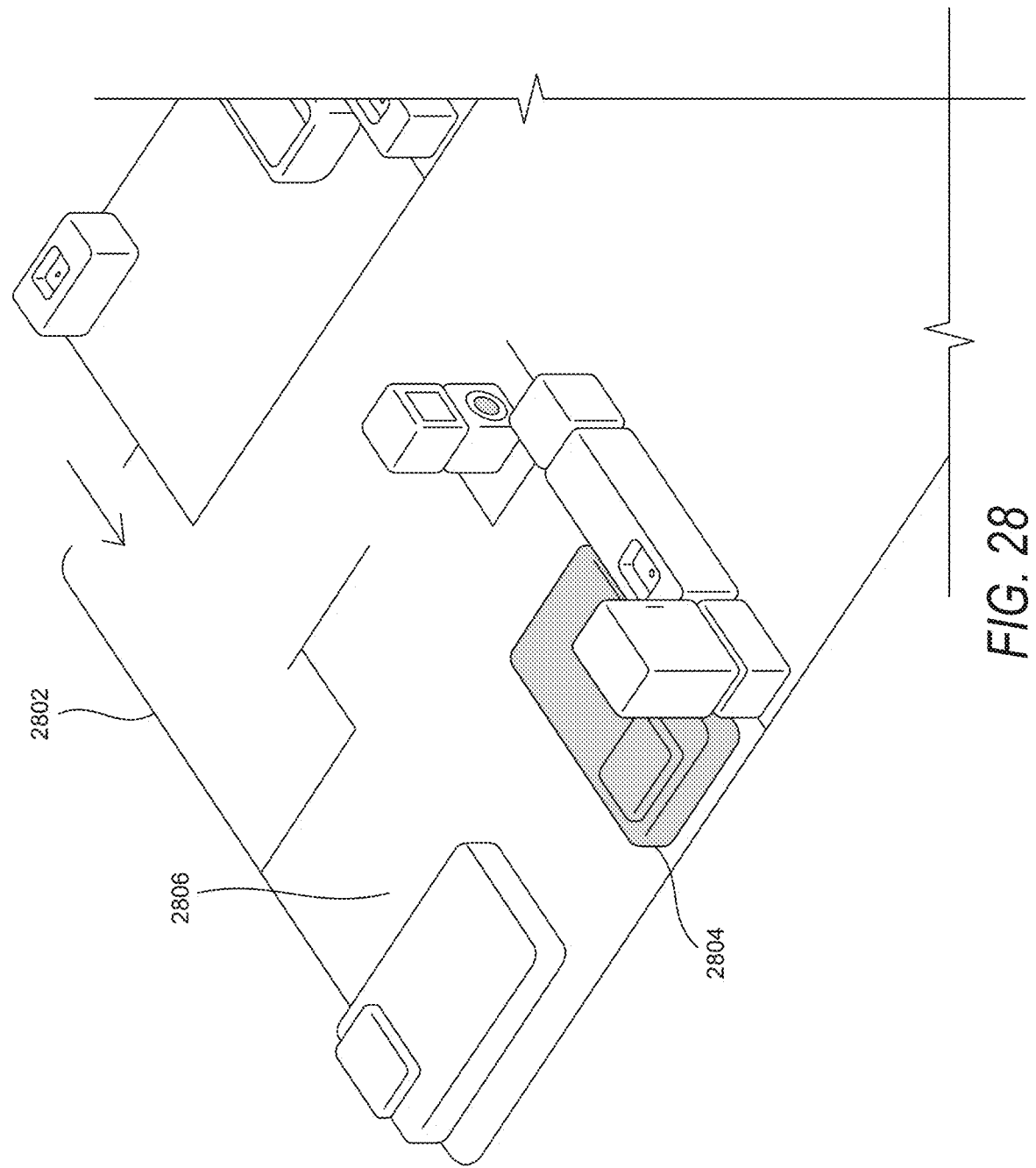

In one example, a user (e.g., guest) may wish to book a shared room in a space. In this example, a 2D floorplan can be used to indicate which bed can be used by the guest and the layout of the room. FIG. 28 illustrates an example 2D floor plan 2802 (e.g., a portion of the 2D floor plan 2802) indicating a bed 2804 that can be used by the guest in the shared room 2806.

The following examples describe various embodiments of methods, machine-readable media, and systems (e.g., machines, devices, or other apparatus) discussed herein.

Example 1. A method, comprising:
 accessing, by a computing system, three-dimensional (3D) image data of a space generated from image data derived from a scan of the space via a camera of a computing device, the 3D image data comprising a 3D mesh of the space comprising a plurality of vertices and each vertex of the plurality of vertices having respective 3D coordinates within the space of the 3D mesh;
 generating a subset of the plurality of vertices comprising vertices that are within a specified height range and have a specified orientation;
 generating a two-dimensional (2D) grid corresponding to the 3D mesh, the 2D grid having a same size and shape as an outer boundary of the 3D mesh;
 applying the subset of the plurality of vertices to the 2D grid, each vertex of the subset of the plurality of vertices represented as a dot on the 2D grid based on an X and Y coordinate of the respective 3D coordinates; and
 rendering a 2D image of the space comprising an outer border corresponding to the size and shape of the 2D grid and indications of walls within the space based on the applied subset of the plurality of vertices.

Example 2. A method according to any of the previous examples, wherein generating a subset of the plurality of vertices comprising vertices that are within a specified height range and have a specified orientation comprises:
 analyzing each vertex of the plurality of vertices to determine if the vertex is within a specified height range based on the respective 3D coordinates;
 discarding, by the computing system, vertices that are not within the specified height range;
 analyzing, by the computing system, each vertex of the plurality of vertices to determine if the vertex has a specified orientation; and
 discarding, by the computing system, vertices that do not have the specified orientation.

Example 3. A method according to any of the previous examples, wherein the outer boundary of the 3D mesh is determined based on the maximum X and Y coordinates in each direction in the space of the 3D mesh.

Example 4. A method according to any of the previous examples, wherein the indications of walls within the space are represented by a clustering of dots corresponding to each vertex of the subset of the plurality of vertices.

Example 5. A method according to any of the previous examples, wherein the indications of walls within the space are represented by lines corresponding to clustering of dots corresponding to each vertex of the subset of the plurality of vertices.

Example 6. A method according to any of the previous examples, further comprising:
 causing display on a computing device of the rendered 2D image of the space.

Example 7. A method according to any of the previous examples, further comprising:
 determining that a portion of the 2D image indicates a room; and
 determining a room type for the portion of the 2D image based on objects detected in the 3D image data that are located in the portion of the 2D image.

Example 8. A method according to any of the previous examples, further comprising:
 rendering images of one or more objects of the objects located in the portion of the 2D image, each rendered image placed in a location associated with coordinates corresponding to the respective object.

Example 9. A method according to any of the previous examples, further comprising:
 causing display on a computing device of the rendered 2D image comprising the rendered images of the one or more objects.

Example 10. A computing system comprising:
 a memory that stores instructions; and
 one or more processors configured by the instructions to perform operations comprising:
 accessing three-dimensional (3D) image data of a space generated from image data derived from a scan of the space via a camera of a computing device, the 3D image data comprising a 3D mesh of the space comprising a plurality of vertices and each vertex of the plurality of vertices having respective 3D coordinates within the space of the 3D mesh;
 generating a subset of the plurality of vertices comprising vertices that are within a specified height range and have a specified orientation;
 generating a two-dimensional (2D) grid corresponding to the 3D mesh, the 2D grid having a same size and shape as an outer boundary of the 3D mesh;
 applying the subset of the plurality of vertices to the 2D grid, each vertex of the subset of the plurality of vertices represented as a dot on the 2D grid based on an X and Y coordinate of the respective 3D coordinates; and
 rendering a 2D image of the space comprising an outer border corresponding to the size and shape of the 2D grid and indications of walls within the space based on the applied subset of the plurality of vertices.

Example 11. A computing system according to any of the previous examples, wherein generating a subset of the plurality of vertices comprising vertices that are within a specified height range and have a specified orientation comprises:
 analyzing each vertex of the plurality of vertices to determine if the vertex is within a specified height range based on the respective 3D coordinates;
 discarding, by the computing system, vertices that are not within the specified height range;
 analyzing, by the computing system, each vertex of the plurality of vertices to determine if the vertex has a specified orientation; and
 discarding, by the computing system, vertices that do not have the specified orientation.

Example 12. A computing system according to any of the previous examples, wherein the outer boundary of the 3D mesh is determined based on the maximum X and Y coordinates in each direction in the space of the 3D mesh.

Example 13. A computing system according to any of the previous examples, wherein the indications of walls within the space are represented by a clustering of dots corresponding to each vertex of the subset of the plurality of vertices.

Example 14. A computing system according to any of the previous examples, wherein the indications of walls within the space are represented by lines corresponding to a clustering of dots corresponding to each vertex of the subset of the plurality of vertices.

Example 15. A computing system according to any of the previous examples, the operations further comprising: causing display on a computing device of the rendered 2D image of the space.

Example 16. A computing system according to any of the previous examples, the operations further comprising: determining that a portion of the 2D image indicates a room; and determining a room type for the portion of the 2D image based on objects detected in the 3D image data that are located in the portion of the 2D image.

Example 17. A computing system according to any of the previous examples, the operations further comprising: rendering images of one or more objects of the objects located in the portion of the 2D image, each rendered image placed in a location associated with coordinates corresponding to the respective object.

Example 18. A computing system according to any of the previous examples, the operations further comprising: causing display on a computing device of the rendered 2D image comprising the rendered images of the one or more objects.

Example 19. A non-transitory computer-readable medium comprising instructions stored thereon that are executable by at least one processor to cause a computing device associated with a first data owner to perform operations comprising:
accessing three-dimensional (3D) image data of a space generated from image data derived from a scan of the space via a camera of a computing device, the 3D image data comprising a 3D mesh of the space comprising a plurality of vertices and each vertex of the plurality of vertices having respective 3D coordinates within the space of the 3D mesh;
generating a subset of the plurality of vertices comprising vertices that are within a specified height range and have a specified orientation;
generating a two-dimensional (2D) grid corresponding to the 3D mesh, the 2D grid having a same size and shape as an outer boundary of the 3D mesh;
applying the subset of the plurality of vertices to the 2D grid, each vertex of the subset of the plurality of vertices represented as a dot on the 2D grid based on an X and Y coordinate of the respective 3D coordinates; and
rendering a 2D image of the space comprising an outer border corresponding to the size and shape of the 2D grid and indications of walls within the space based on the applied subset of the plurality of vertices.

Example 20. A non-transitory computer-readable medium according to any of the previous examples, wherein generating a subset of the plurality of vertices comprising vertices that are within a specified height range and have a specified orientation comprises:
analyzing each vertex of the plurality of vertices to determine if the vertex is within a specified height range based on the respective 3D coordinates;
discarding, by the computing system, vertices that are not within the specified height range;
analyzing, by the computing system, each vertex of the plurality of vertices to determine if the vertex has a specified orientation; and discarding, by the computing system, vertices that do not have the specified orientation.

Figure 29:
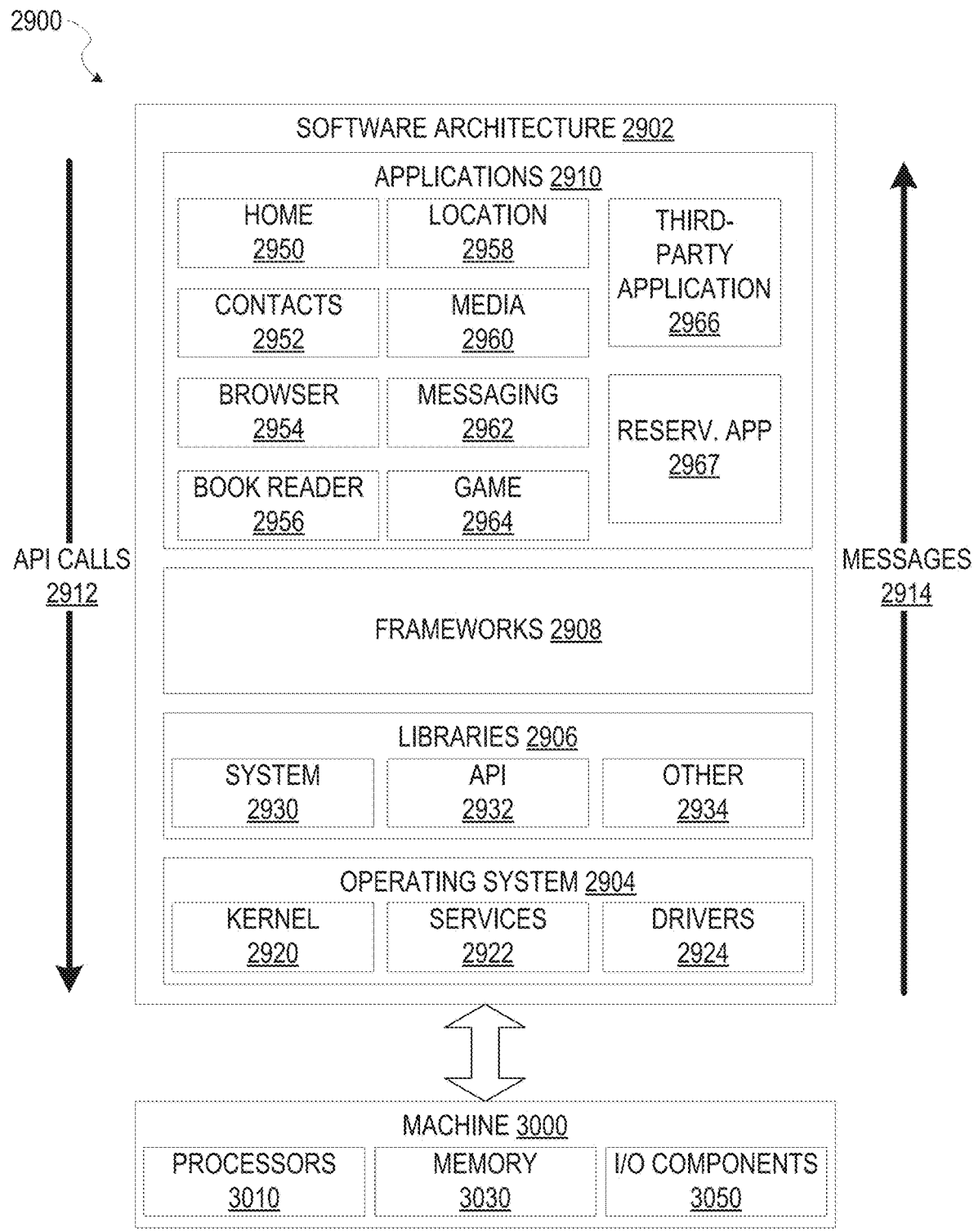
FIG. 29 is a block diagram illustrating an example of a software architecture that may be installed on a machine, according to some example embodiments.

FIG. 29 is a block diagram 2900 illustrating a software architecture 2902, which can be installed on any one or more of the devices described above. For example, in various embodiments, the client device 110 and server systems 102, 120, 122, and 124 may be implemented using some or all of the elements of the software architecture 2902. FIG. 29 is merely a non-limiting example of a software architecture, and it will be appreciated that many other architectures can be implemented to facilitate the functionality described herein. In various embodiments, the software architecture 2902 is implemented by hardware such as a machine 3000 of FIG. 30 that includes processors 3010, memory 3030, and input/output (I/O) components 3050. In this example, the software architecture 2902 can be conceptualized as a stack of layers where each layer may provide a particular functionality. For example, the software architecture 2902 includes layers such as an operating system 2904, libraries 2906, frameworks 2908, and applications 2910. Operationally, the applications 2910 invoke application programming interface (API) calls 2912 through the software stack and receive messages 2914 in response to the API calls 2912, consistent with some embodiments.

In various implementations, the operating system 2904 manages hardware resources and provides common services. The operating system 2904 includes, for example, a kernel 2920, services 2922, and drivers 2924. The kernel 2920 acts as an abstraction layer between the hardware and the other software layers, consistent with some embodiments. For example, the kernel 2920 provides memory management, processor management (e.g., scheduling), component management, networking, and security settings, among other functionality. The services 2922 can provide other common services for the other software layers. The drivers 2924 are responsible for controlling or interfacing with the underlying hardware, according to some embodiments. For instance, the drivers 2924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 2906 provide a low-level common infrastructure utilized by the applications 2910. The libraries 2906 can include system libraries 2930 (e.g., C standard library) that can provide functions such as memory allocation functions, string manipulation functions, mathematic functions, and the like. In addition, the libraries 2906 can include API libraries 2932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 2906 can also include a wide variety of other libraries 2934 to provide many other APIs to the applications 2910.

The frameworks 2908 provide a high-level common infrastructure that can be utilized by the applications 2910, according to some embodiments. For example, the frameworks 2908 provide various graphic user interface (GUI) functions, high-level resource management, high-level location services, and so forth. The frameworks 2908 can provide a broad spectrum of other APIs that can be utilized by the applications 2910, some of which may be specific to a particular operating system 2904 or platform.

In an example embodiment, the applications 2910 include a home application 2950, a contacts application 2952, a browser application 2954, a book reader application 2956, a location application 2958, a media application 2960, a messaging application 2962, a game application 2964, and a broad assortment of other applications, such as a third-party application 2966. According to some embodiments, the applications 2910 are programs that execute functions defined in the programs. Various programming languages can be employed to create one or more of the applications 2910, structured in a variety of manners, such as object-oriented programming languages (e.g., Objective-C, Java, or C++) or procedural programming languages (e.g., C or assembly language). In a specific example, the third-party application 2966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2966 can invoke the API calls 2912 provided by the operating system 2904 to facilitate functionality described herein.

Some embodiments may particularly include a reservation application 2967, which may be any application that requests data or other tasks to be performed by systems and servers described herein, such as the server system 102, third-party servers, and so forth. In certain embodiments, this may be a standalone application that operates to manage communications with a server system such as server system 102. In other embodiments, this functionality may be integrated with another application. The reservation application 2967 may request and display various data related to an online marketplace and may provide the capability for a user 106 to input data related to the system via voice, a touch interface, or a keyboard, or using a camera device of the machine 3000, communication with a server system via the I/O components 3050, and receipt and storage of object data in the memory 3030. Presentation of information and user inputs associated with the information may be managed by the trip reservation application 2967 using different frameworks 2908, library 2906 elements, or operating system 2904 elements operating on a machine 3000.

Some embodiments may particularly include a 2D floor plan generation application (not shown), which may be any application that requests data or other tasks to be performed by systems and servers described herein, such as the server system 102, third-party servers, and so forth. In certain embodiments, this may be a standalone application that operates to manage communications with a server system such as server system 102. In other embodiments, this functionality may be integrated with another application. The 2D floor plan generation application may request and display various data related to an online marketplace and may provide the capability for a user 106 to input data related to the system via voice, a touch interface, or a keyboard, or using a camera device of the machine 1900, communication with a server system via the I/O components 3050, and receipt and storage of object data in the memory 3030. Presentation of information and user inputs associated with the information may be managed by the 2D floor plan generation application using different frameworks 2908, library 2906 elements, or operating system 1804 elements operating on a machine 3000.

Figure 30:
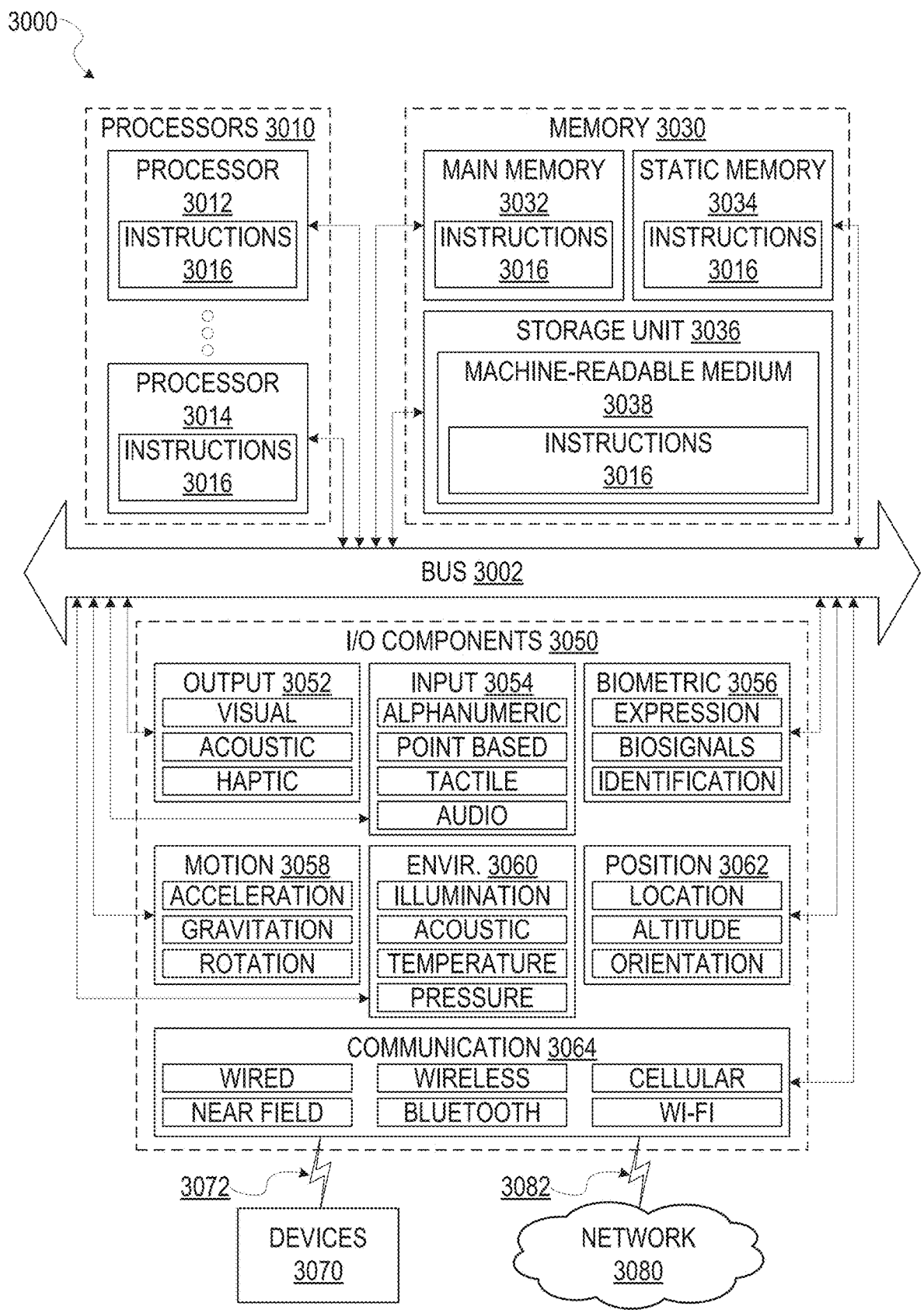
FIG. 30 illustrates a diagrammatic representation of a machine, in the form of a computer system, within which a set of instructions may be executed for causing the machine to perform any one or more of the methodologies discussed herein, according to an example embodiment.

FIG. 3000 is a block diagram illustrating components of a machine 3000, according to some embodiments, able to read instructions from a machine-readable medium (e.g., a machine-readable storage medium) and perform any one or more of the methodologies discussed herein. Specifically, FIG. 30 shows a diagrammatic representation of the machine 3000 in the example form of a computer system, within which instructions 3016 (e.g., software, a program, an application 2910, an applet, an app, or other executable code) for causing the machine 3000 to perform any one or more of the methodologies discussed herein can be executed. In alternative embodiments, the machine 3000 operates as a standalone device or can be coupled (e.g., networked) to other machines. In a networked deployment, the machine 3000 may operate in the capacity of a server machine 102, 120, 122, 124, and the like, or a client device 110 in a server-client network environment, or as a peer machine in a peer-to-peer (or distributed) network environment. The machine 3000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 3016, sequentially or otherwise, that specify actions to be taken by the machine 3000. Further, while only a single machine 3000 is illustrated, the term "machine" shall also be taken to include a collection of machines 3000 that individually or jointly execute the instructions 3016 to perform any one or more of the methodologies discussed herein.

In various embodiments, the machine 3000 comprises processors 3010, memory 3030, and I/O components 3050, which can be configured to communicate with each other via a bus 3002. In an example embodiment, the processors 3010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 3012 and a processor 3014 that may execute the instructions 3016. The term "processor" is intended to include multi-core processors 3010 that may comprise two or more independent processors 3012, 3014 (also referred to as "cores") that can execute instructions 3016 contemporaneously. Although FIG. 30 shows multiple processors 3010, the machine 3000 may include a single processor 3010 with a single core, a single processor 3010 with multiple cores (e.g., a multi-core processor 3010), multiple processors 3012, 3014 with a single core, multiple processors 3012, 3014 with multiple cores, or any combination thereof.

The memory 3030 comprises a main memory 3032, a static memory 3034, and a storage unit 3036 accessible to the processors 3010 via the bus 3002, according to some embodiments. The storage unit 3036 can include a machine-readable medium 3038 on which are stored the instructions 3016 embodying any one or more of the methodologies or functions described herein. The instructions 3016 can also reside, completely or at least partially, within the main memory 3032, within the static memory 3034, within at least one of the processors 3010 (e.g., within the processor's cache memory), or any suitable combination thereof, during execution thereof by the machine 3000. Accordingly, in various embodiments, the main memory 3032, the static memory 3034, and the processors 3010 are considered machine-readable media 3038.

As used herein, the term "memory" refers to a machine-readable medium 3038 able to store data temporarily or permanently and may be taken to include, but not be limited to, random-access memory (RAM), read-only memory (ROM), buffer memory, flash memory, and cache memory. While the machine-readable medium 3038 is shown, in an example embodiment, to be a single medium, the term "machine-readable medium" should be taken to include a single medium or multiple media (e.g., a centralized or distributed database, or associated caches and servers) able to store the instructions 3016. The term "machine-readable medium" shall also be taken to include any medium, or combination of multiple media, that is capable of storing instructions (e.g., instructions 3016) for execution by a machine (e.g., machine 3000), such that the instructions 3016, when executed by one or more processors of the machine 3000 (e.g., processors 3010), cause the machine 3000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 3050 include a wide variety of components to receive input, provide output, produce output, transmit information, exchange information, capture measurements, and so on. In general, it will be appreciated that the I/O components 3050 can include many other components that are not shown in FIG. 30. The I/O components 3050 are grouped according to functionality merely for simplifying the following discussion, and the grouping is in no way limiting. In various example embodiments, the I/O components 3050 include output components 3052 and input components 3054. The output components 3052 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 3054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 3050 include biometric components 3056, motion components 3058, environmental components 3060, or position components 3062, among a wide array of other components. For example, the biometric components 3056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 3058 include acceleration sensor components (e.g., accelerometer), gravitation sensor components, rotation sensor components (e.g., gyroscope), and so forth. The environmental components 3060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 3062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 3050 may include communication components 3064 operable to couple the machine 3000 to a network 3080 or devices 3070 via a coupling 3082 and a coupling 3072, respectively. For example, the communication components 3064 include a network interface component or another suitable device to interface with the network 3080. In further examples, communication components 3064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 3070 may be another machine 3000 or any of a wide variety of peripheral devices (e.g., a peripheral device coupled via a Universal Serial Bus (USB)).

Moreover, in some embodiments, the communication components 3064 detect identifiers or include components operable to detect identifiers. For example, the communication components 3064 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 3064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 3080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 3080 or a portion of the network 3080 may include a wireless or cellular network, and the coupling 3082 may be a Code Division Multiple Access (CDMA) connection, a Global System for Mobile communications (GSM) connection, or another type of cellular or wireless coupling. In this example, the coupling 3082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 3016 are transmitted or received over the network 3080 using a transmission medium via a network interface device (e.g., a network interface component included in the communication components 3064) and utilizing any one of a number of well-known transfer protocols (e.g., Hypertext Transfer Protocol (HTTP)). Similarly, in other example embodiments, the instructions 3016 are transmitted or received using a transmission medium via the coupling 3072 (e.g., a peer-to-peer coupling) to the devices 3070. The term "transmission medium" shall be taken to include any intangible medium that is capable of storing, encoding, or carrying the instructions 3016 for execution by the machine 3000, and includes digital or analog communications signals or other intangible media to facilitate communication of such software.

Furthermore, the machine-readable medium 3038 is non-transitory (in other words, not having any transitory signals) in that it does not embody a propagating signal. However, labeling the machine-readable medium 3038 "non-transitory" should not be construed to mean that the medium is incapable of movement; the machine-readable medium 3038 should be considered as being transportable from one physical location to another. Additionally, since the machine-readable medium 3038 is tangible, the machine-readable medium 3038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
accessing, by a computing system, three-dimensional (3D) image data of a space generated from image data derived from a scan of the space via a camera of a computing device, the 3D image data comprising a 3D mesh of the space comprising a plurality of vertices and each vertex of the plurality of vertices having respective 3D coordinates within the space of the 3D mesh;
determining a largest Y coordinate value in the 3D mesh and a smallest Y coordinate value in the 3D mesh;
generating a height range comprising the difference between the largest Y coordinate value and the smallest Y coordinate value in the 3D mesh;
generating a minimum height boundary based on the smallest Y coordinate value in the 3D mesh, a specified minimum bound, and the generated height range;
generating a maximum height boundary based on the largest Y coordinate value in the 3D mesh, a specified maximum bound, and the generated height range;
generating a subset of the plurality of vertices comprising vertices that are within the generated minimum height boundary and maximum height boundary and have a vertical orientation;
generating an outer boundary for the 3D mesh using the maximum X and Y coordinates in each direction in the space of the 3D mesh;
generating a two-dimensional (2D) grid corresponding to the 3D mesh, the 2D grid having a same size and shape as the generated outer boundary of the 3D mesh;
applying the subset of the plurality of vertices to the 2D grid, each vertex of the subset of the plurality of vertices represented as a dot on the 2D grid based on an X and Y coordinate of the respective 3D coordinates; and rendering a 2D image of the space comprising an outer border corresponding to the size and shape of the 2D grid and indications of walls within the space based on the applied subset of the plurality of vertices.

2. The method of claim 1, further comprising:

discarding, by the computing system, vertices that are not within the generated minimum height boundary and maximum height boundary;

discarding, by the computing system, vertices that do not have a vertical orientation.

3. The method of claim 1, wherein the indications of walls within the space are represented by a clustering of dots corresponding to each vertex of the subset of the plurality of vertices.

4. The method of claim 1, wherein the indications of walls within the space are represented by lines corresponding to clustering of dots corresponding to each vertex of the subset of the plurality of vertices.

5. The method of claim 1, further comprising:

causing display on a computing device of the rendered 2D image of the space.

6. The method of claim 1, further comprising:

determining that a portion of the 2D image indicates a room; and determining a room type for the portion of the 2D image based on objects detected in the 3D image data that are located in the portion of the 2D image.

7. The method of claim 6, further comprising:

rendering images of one or more objects of the objects located in the portion of the 2D image, each rendered image placed in a location associated with coordinates corresponding to the respective object.

8. The method of claim 7, further comprising:

causing display on a computing device of the rendered 2D image comprising the rendered images of the one or more objects.

9. The method of claim 1, further comprising:

causing display of the rendered 2D image adjacent to a display a 3D representation of the space.

10. The method of claim 9, wherein the display further comprises controls for rotating the rendered 2D image and the 3D representation of the space and wherein rotating the 2D image using the controls results in the 3D representation rotating in the same way and rotating the 3D representation results in the rendered 2D image rotating in the same way.

11. The method of claim 9, wherein the display further comprises an option to edit the rendered 2D image, and further comprising:

receiving edits comprising lines representing walls or designated spaces within the space;

generating a 2D floor plan comprising the lines representing the walls or designated spaces within the space;

receiving a request to upload the generated 2D floor plan to a listing for a place in an online marketplace; and adding the generated 2D floor plan to the listing for the place in an online marketplace.

12. The method of claim 11, wherein the generated 2D floor plan is displayed concurrently with each image of the space, and a room of the generated 2D floor plan is highlighted when an image corresponding to the room is displayed.

13. A computing system comprising:

a memory that stores instructions; and one or more processors configured by the instructions to perform operations comprising:

accessing three-dimensional (3D) image data of a space generated from image data derived from a scan of the space via a camera of a computing device, the 3D image data comprising a 3D mesh of the space comprising a plurality of vertices and each vertex of the plurality of vertices having respective 3D coordinates within the space of the 3D mesh;

determining a largest Y coordinate value in the 3D mesh and a smallest Y coordinate value in the 3D mesh;

generating a height range comprising the difference between the largest Y coordinate value and the smallest Y coordinate value in the 3D mesh;

generating a minimum height boundary based on the smallest Y coordinate value in the 3D mesh, a specified minimum bound, and the generated height range;

generating a maximum height boundary based on the largest Y coordinate value in the 3D mesh, a specified maximum bound, and the generated height range;

generating a subset of the plurality of vertices comprising vertices that are within the generated minimum height boundary and maximum height boundary and have a vertical orientation;

generating an outer boundary for the 3D mesh using the maximum X and Y coordinates in each direction in the space of the 3D mesh;

generating a two-dimensional (2D) grid corresponding to the 3D mesh, the 2D grid having a same size and shape as the generated outer boundary of the 3D mesh;

applying the subset of the plurality of vertices to the 2D grid, each vertex of the subset of the plurality of vertices represented as a dot on the 2D grid based on an X and Y coordinate of the respective 3D coordinates; and rendering a 2D image of the space comprising an outer border corresponding to the size and shape of the 2D grid and indications of walls within the space based on the applied subset of the plurality of vertices.

14. The computing system of claim 13, wherein the indications of walls within the space are represented by a clustering of dots corresponding to each vertex of the subset of the plurality of vertices.

15. The computing system of claim 13, wherein the indications of walls within the space are represented by lines corresponding to a clustering of dots corresponding to each vertex of the subset of the plurality of vertices.

16. The computing system of claim 13, the operations further comprising:

causing display on a computing device of the rendered 2D image of the space.

17. The computing system of claim 13, the operations further comprising:

determining that a portion of the 2D image indicates a room; and determining a room type for the portion of the 2D image based on objects detected in the 3D image data that are located in the portion of the 2D image.

18. The computing system of claim 17, the operations further comprising:

rendering images of one or more objects of the objects located in the portion of the 2D image, each rendered image placed in a location associated with coordinates corresponding to the respective object.

19. The computing device of claim 18, the operations further comprising:

causing display on a computing device of the rendered 2D image comprising the rendered images of the one or more objects.

20. A non-transitory computer-readable medium comprising instructions stored thereon that are executable by at least one processor to cause a computing device associated with a first data owner to perform operations comprising:

accessing three-dimensional (3D) image data of a space generated from image data derived from a scan of the space via a camera of a computing device, the 3D image data comprising a 3D mesh of the space comprising a plurality of vertices and each vertex of the plurality of vertices having respective 3D coordinates within the space of the 3D mesh;

determining a largest Y coordinate value in the 3D mesh and a smallest Y coordinate value in the 3D mesh;

generating a height range comprising the difference between the largest Y coordinate value and the smallest Y coordinate value in the 3D mesh;

generating a minimum height boundary based on the smallest Y coordinate value in the 3D mesh, a specified minimum bound, and the generated height range;

generating a maximum height boundary based on the largest Y coordinate value in the 3D mesh, a specified maximum bound, and the generated height range;

generating a subset of the plurality of vertices comprising vertices that are within the generated minimum height boundary and maximum height boundary and have a vertical orientation;

generating an outer boundary for the 3D mesh using the maximum X and Y coordinates in each direction in the space of the 3D mesh;

generating a two-dimensional (2D) grid corresponding to the 3D mesh, the 2D grid having a same size and shape as the generated outer boundary of the 3D mesh;

applying the subset of the plurality of vertices to the 2D grid, each vertex of the subset of the plurality of vertices represented as a dot on the 2D grid based on an X and Y coordinate of the respective 3D coordinates; and rendering a 2D image of the space comprising an outer border corresponding to the size and shape of the 2D grid and indications of walls within the space based on the applied subset of the plurality of vertices.

* * * * *